US006993417B2

(12) United States Patent
Osann, Jr.

(10) Patent No.: US 6,993,417 B2
(45) Date of Patent: Jan. 31, 2006

(54) SYSTEM FOR ENERGY SENSING ANALYSIS AND FEEDBACK

(76) Inventor: Robert Osann, Jr., 328 Costello Ct., Los Altos, CA (US) 94024

(*) Notice: Subject to any disclaimer, the term of this patent is extended or adjusted under 35 U.S.C. 154(b) by 136 days.

(21) Appl. No.: 09/949,551

(22) Filed: Sep. 10, 2001

(65) Prior Publication Data

US 2003/0050737 A1    Mar. 13, 2003

(51) Int. Cl.
G06F 17/00     (2006.01)
G01R 19/00     (2006.01)

(52) U.S. Cl. .................. 700/291; 340/635; 702/62
(58) Field of Classification Search ............... 700/22, 700/90, 275, 286, 291, 297; 702/57, 60–62, 702/64–68, 70, 71; 705/412; 340/635, 637, 340/654
See application file for complete search history.

(56) References Cited

U.S. PATENT DOCUMENTS

| | | | | |
|---|---|---|---|---|
| 4,351,028 A | * | 9/1982 | Peddie et al. ............... 700/286 |
| 4,858,141 A | | 8/1989 | Hart et al. .................... 702/61 |
| 5,086,385 A | * | 2/1992 | Launey et al. ................ 700/83 |
| 5,455,861 A | * | 10/1995 | Faucher et al. ............. 380/266 |
| 5,483,153 A | | 1/1996 | Leeb et al. ............... 324/76.12 |
| 5,519,878 A | * | 5/1996 | Dolin, Jr. .................... 709/220 |
| 5,572,438 A | * | 11/1996 | Ehlers et al. ............... 700/295 |
| 5,621,662 A | * | 4/1997 | Humphries et al. .......... 700/276 |
| 5,650,771 A | * | 7/1997 | Lee ............................ 340/656 |
| 5,717,325 A | | 2/1998 | Leeb et al. ............... 324/76.12 |
| 5,861,683 A | * | 1/1999 | Engel et al. .................... 307/38 |
| 5,924,486 A | * | 7/1999 | Ehlers et al. ................ 165/238 |
| 5,962,989 A | * | 10/1999 | Baker .......................... 700/276 |
| 6,289,267 B1 | * | 9/2001 | Alexander et al. .......... 700/286 |
| 6,453,687 B2 | * | 9/2002 | Sharood et al. ............... 62/127 |
| 6,480,889 B1 | * | 11/2002 | Saito et al. ................... 709/220 |
| 6,587,739 B1 | * | 7/2003 | Abrams et al. ............... 700/83 |
| 6,766,222 B1 | * | 7/2004 | Duley .......................... 700/286 |
| 6,891,478 B2 | * | 5/2005 | Gardner ...................... 340/635 |
| 2001/0034754 A1 | * | 10/2001 | Elwahab et al. ............ 709/201 |
| 2003/0110380 A1 | * | 6/2003 | Carolsfeld et al. .......... 713/168 |

FOREIGN PATENT DOCUMENTS

EP        1 136 829 B1      3/2001

* cited by examiner

Primary Examiner—Paul Rodriguez

(57) ABSTRACT

A system is described where the existing proliferation of standard electrical junction boxes in a typical home or building implement a form of "Bio-Feedback for Home Energy", increasing user awareness and enabling more effective and efficient energy usage. Energy-related information is gathered by way of EMAC (Energy Monitoring And Control) points typically installed at standard electrical junction boxes used for power plug receptacles and wall switches. In addition to being visually displayed at the point of energy use or measurement, energy-related information—electrical and thermal—is typically communicated through a powerline or wireless data link to a centrally located intelligent device where it is monitored, analyzed, profiled, viewed, and also used for energy-related control functions. Energy consumption can be alternately displayed in terms of cost-per-time. Energy monitoring may be also added at the electrical breaker box to supplement distributed EMAC points.

4 Claims, 28 Drawing Sheets

EMAC Locations - Switch, Plug, Dedicated

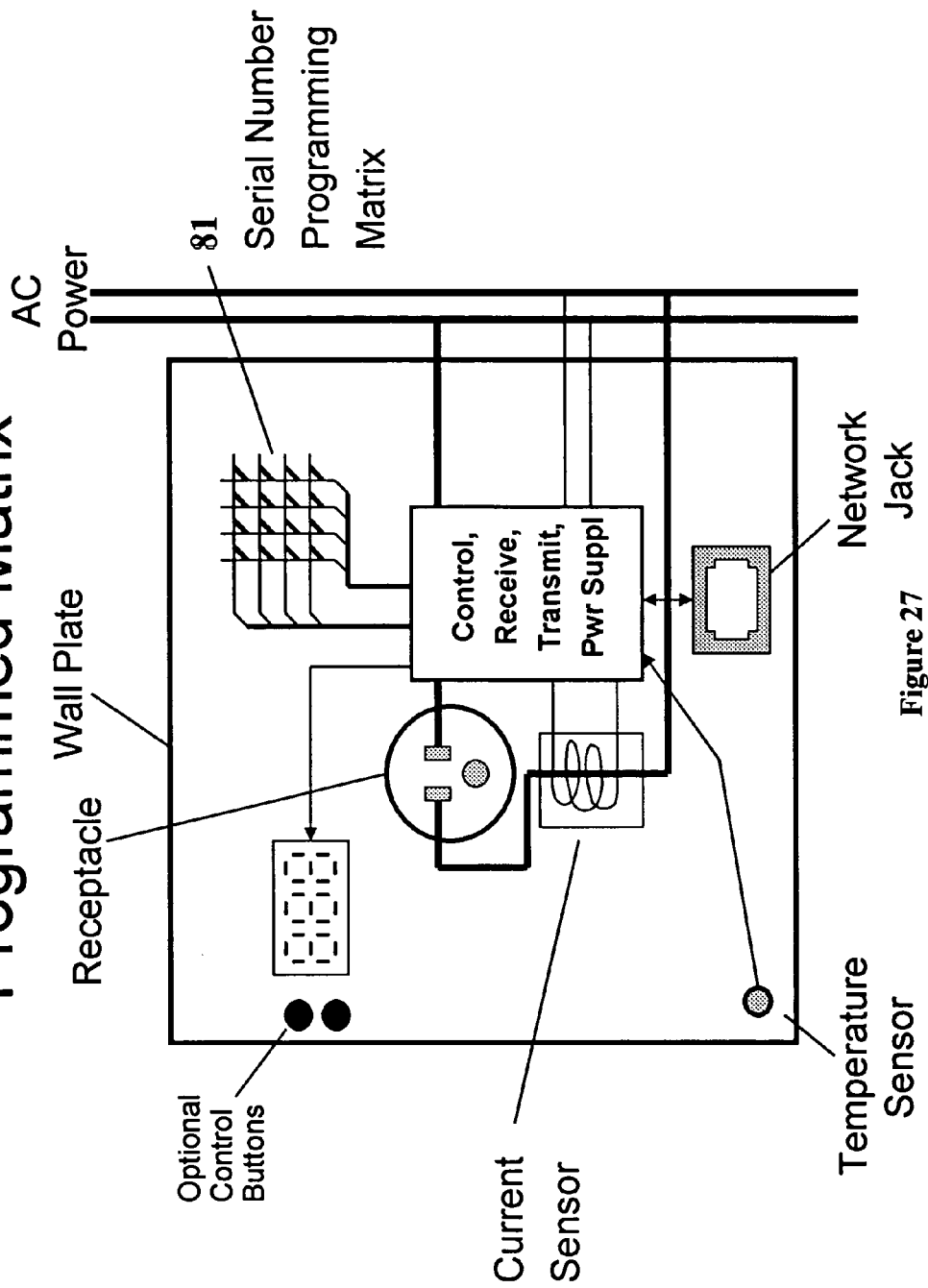

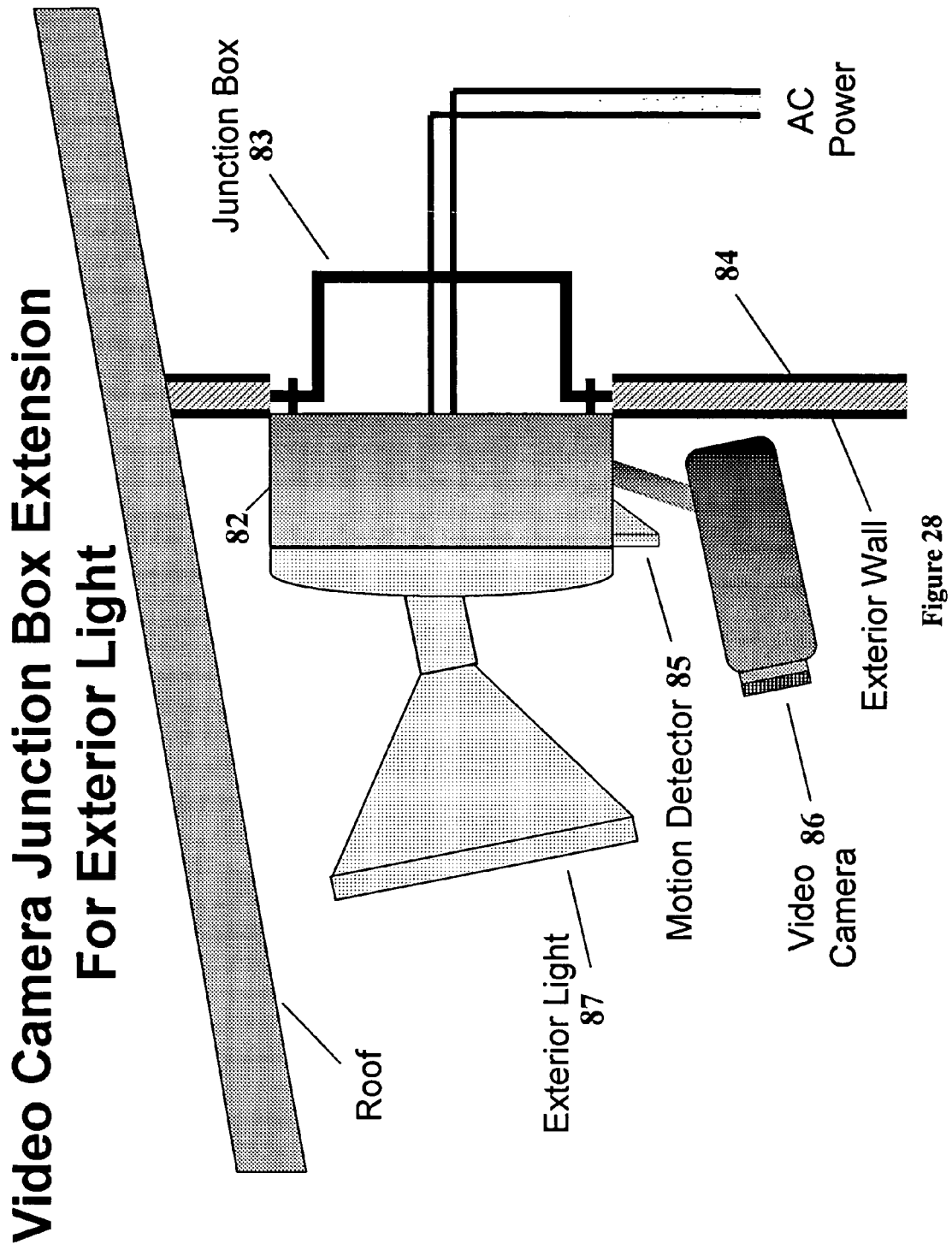

SYSTEM FOR ENERGY SENSING ANALYSIS AND FEEDBACK

CROSS REFERENCE TO RELATED DOCUMENTS

This application is based on disclosure document Ser. No. 493,964 filed on May 21, 2001 under the USPTO disclosure document program, entitled "Home/Building Monitor and Control System with Emphasis on Energy Feedback and Profiling", incorporated by reference herein.

FIELD OF THE INVENTION

This invention generally relates to the field of electronic systems for homes and buildings, including systems for home networking, home energy and appliance controls, and home security/surveillance systems, with special emphasis on energy monitoring, feedback and profiling, and in particular, the use of electrical junction boxes for purposes they do not normally perform. Although many of the features of this invention will be described in relation to a residential home environment, it is understood that they are generally applicable to many office and industrial building applications as well.

BACKGROUND

Many products have been introduced over the last 25 years for controlling electrical and electronic devices and appliances within homes and buildings. It is well known to use a variety of communications mediums to enable this control (power lines, phone lines, and purpose built network connectivity such as cabled Ethernet or wireless networks).

More recently, it is known to extend this control to connection via the Internet allowing a further degree of remote control and communication. In addition, surveillance capabilities have been added by using video cameras that can transmit images to monitors in other parts of the home/building as well as supplying these images to remote locations via the Internet. Also, there is discussion that future home and building appliances (washing machines, refrigerators, etc.) will connect to the Internet such that they can communicate over the Internet directly. Among other possible remote interactions, they can communicate their condition and signal the need for service before breakdowns occur, as well as enable diagnostics to be performed remotely via the Internet.

The move toward home and building automation has not necessarily been prioritized according to how the general public accepts new things—especially in light of the fact that old habits are hard to break regarding how one deals with power consuming devices in homes and buildings. While most people may not be ready to have their lights and appliances controlled automatically, there are other motivations that may move them toward installing a home/building monitoring and control system:

Saving money given increasing energy costs

Security/Surveillance/Remote Care

The pervasive nature of home networking and Internet connectivity

Expansion of home entertainment capabilities

Interaction of Monitoring/Feedback with Automated and Manual Control

The psychological element is extremely critical in the adoption rate of any system involving monitoring and/or control. Letting a computer control one's home/building appliances that in the past were controlled manually, is a sensitive issue. A monitoring and feedback system is much less disturbing or threatening, but for users who wish to add some amount of automatic control, there must be a carefully planned interaction between the two. It is not uncommon for some lights in homes, and especially in office buildings, to be controlled by circuits containing motion detectors. Invariably, there are occurrences where the motion detector causes the lights to be shut off at the wrong time. This can easily get annoying since, as is commonly known, it takes a multitude of positive interactions to overcome the emotional effect of a single negative interaction. Alternately, let's say that there exists a local PC (Personal Computer) running software for home automation and control, and a centrally controlled light switch that is programmed to shut off at 1:00 AM regardless of switch position to ensure that it is not left on all night accidentally.

Now, let's say the user has stayed up late and is in the room with this switch. At the programmed time, the automatic control system will shut off the power at the switch. (It may signal the user some time prior to shutting off by flashing the lights). To prevent the switch in question from causing the user great aggravation, it must have the ability to override the auto shutoff event. If the switch has a transmit capability such as that described below for EMAC (Energy Monitoring And Control) points, the user could, for instance, toggle the switch or push a mode button after the flashing warning (or if the light has turned off already), and that action would be transmitted back to the central controlling PC to allow a revised scenario to occur. Even if the override can be performed locally without interaction with the central PC, it is useful to transmit back to the central PC that the event has happened to aid in avoiding similar user aggravation in the future. For instance, the central control system could "learn" and, in this case, delay the auto shutoff of that particular light switch until 1:00 AM or later, or switch to a motion detector-controlled mode after 1:00.

The most common mechanism today for controlling lights is based on motion detectors incorporated into the controlling switch assembly or alternately incorporated into the light socket assembly. These work fairly well in some circumstances—especially in spaces where people seldom go such as attics and closets. However, in primary living areas, they can often cause a negative interaction with the user. For instance, the inventor installed a light switch with motion detector at the entry to his living room. Unfortunately, the detector's range does not cover the entire room, thus occasionally leaving the inventor "in the dark". Were there a multitude of motion detectors scattered around this same room—communicating through a data communications link such that the light control circuit was guided in a more informed manner (as described later in this invention) —the inventor would be more positively illuminated.

Interaction of Monitoring/Feedback with Audio/Video Functionality

Although this invention deals primarily with energy use, monitoring, feedback, and control, the overall system in a given home or building may also deal with the distribution and control of multi-media information including audio and video. Over time, the communications link between the EMAC points of this invention and the central controlling device (usually a PC or Residential Gateway), will have more and more bandwidth capability, such that this link also becomes the primary means for distributing digital multimedia information throughout the home or building. Thus, there will be a coexistence, if not a functional link, between the elements of this invention focused on energy monitoring, feedback, and control, and elements focused on audio/video integration and control. This transmission of audio/video information can be for communications, security, or entertainment purposes.

No Feedback on Energy Consumption

At the time of this writing, energy costs have risen substantially and are likely to continue to do so. One of the first, and most important problems consumers are faced with is knowing exactly where, and how much power is being consumed in specific areas/appliances in their homes and buildings. Today's home and building automation systems are much more focused on controlling than on providing energy usage feedback. Meanwhile, the typical occupant may have little or no idea of where the energy is actually being consumed.

Simplistic Control of Heating and Cooling Systems based on Limited Information

Today's typical control system for heating and cooling, the traditional thermostat, does not take advantage of networked connectivity and the information gathering that it affords, thereby missing the opportunity to provide a much more comfortable and energy efficient thermal environment. Even today's "programmable" thermostat observes only the temperature at it's own location. It is therefore very common for rooms or offices not containing the thermostat to be overheated or overcooled. Such rooms or offices waste energy if they are not occupied, or make the occupants uncomfortable if they are occupied.

Security Systems

The International Association of Chiefs of Police estimates that between 95% and 98% of all home-alarm calls are false, costing police departments nationwide about $600 million a year. If a Security Company, or the Police, could remotely view the interior of the home or building where the alarm has just been activated, most of this money could be saved. Security companies offer video surveillance, but the systems are complex and expensive and not easily adapted to existing homes without extensive additional wiring and adding provisions for mounting and powering the video cameras.

SUMMARY

Overall, the home system described in this invention relates to the energy distribution systems in a home or building. Much of the uniqueness in this invention deals with the combining of diverse functionalities that heretofore have not been combined in similar ways. Although the digital communications networks or links described in this invention are typically based on communication by sending signals through existing electrical power wiring (hence the term "powerline communications"), not all embodiments are restricted to this form of communications. However, when powerline communication is utilized herein, the result is a system that uses electrical wiring for energy distribution, monitoring, and control as well as security, audio/video communications and entertainment, and general network communications such as file transfers and Internet connectivity.

Energy consumption in most homes/buildings today is made up of both electrical power and some form of oil/gas based power. Some homes and buildings use electrical power only. This invention deals with both, although many of the features described can be optionally used in different combinations as desired by the customer.

A primary aspect of this invention is to provide a form of "biofeedback" for home and building energy consumption. By providing easy to understand information to consumers, they can adjust their usage of energy and still have normal control of their power-consuming devices—over time transitioning to automated control as they desire. Also, some specific capabilities of this invention enhance the effectiveness of automated energy controls.

Electrical energy is typically consumed by devices attached to electrical junction boxes. These junction boxes are typically proliferated throughout a home or building. As a result, they become not only convenient locations to measure and display electrical power consumption—they also provide a convenient means to proliferate temperature sensors, motion detectors, and video cameras. The same communications mechanism used for transmitting power-related data is typically used for these additional functionalities which aid in the enhancement of energy control (both thermal and electrical) while enhancing security at the same time.

This invention has the following primary goals regarding energy feedback:

1) Provide "instant feedback" at the point of usage.
2) Provide electrical energy usage profiling with multi-dimensional graphics on a centrally located PC, or Residential Gateway. Include both spatial usage and usage over time. Transfer related information via the Internet as necessary and desired.
3) Provide thermal profiling on a centrally located PC, Residential Gateway, or Smart Thermostat. Use multi-dimensional graphics as useful or appropriate. Include both spatial profiling and profiling over time.
4) Provide more intelligent and efficient thermal energy usage by combining a multi dimensional thermal profile with an enhanced and more intelligent (thermostat) control system for heating and cooling.

Another object of this invention is to allow easy retrofit of all components into existing homes/buildings with minimal or no modification to the home/building or special skills required on the part of the installer. This goal is greatly facilitated by attachment to and communications through existing electrical junction boxes.

Another object of this invention is to provide integration of the energy feedback and profiling mechanisms with various known and/or new types of control mechanisms.

A home/building system according to this invention provides a unique solution for energy profiling and feedback, while including network connectivity, energy control, surveillance, communications, and entertainment functionality as deemed necessary, useful, or desired. This invention essentially creates a "bio-feedback" mechanism for energy use, covering both electrical and thermal energy, through a system architecture that enables a more thorough and broad-based gathering of energy related information. This information is used by the occupant to allow manual control of power consumption in a more informed and effective manner, and also to allow either partial or fully automatic control of energy consumption to be more effectively performed as well.

For the most part, this invention takes advantage of the pervasiveness of electrical junction boxes, typically implementing power plug outlets and the wall switches, within any home or building. These become convenient locations for installing what are called EMAC (Energy Monitoring And Control) points. As explained later, an EMAC point will typically contain one or more forms of energy sensor, often containing both electrical current sensors and a temperature sensor. Since EMAC points typically reside at locations having convenient access to electrical power, they are normally powered directly by this available source, and also typically contain a digital communications circuit that communicates with the central computer, Residential Gateway, or other data gathering and/or controlling device via power line communications, although other forms of data communications—such as wireless—can be used under the right circumstances. This communication link then affords a basic backbone infrastructure for network connections in general. EMAC points may also communicate with other EMAC points as appropriate.

Thus, in an environment where network connectivity has not yet been made readily available (typically referring to the home environment), the installation of EMAC points creates a local network infrastructure that can be built upon before adding other capabilities in addition to normal computer connectivity. These include facilities for enabling home surveillance, security, and entertainment. Not all EMAC points contain a "control" capability. In some cases it is not appropriate due to the type of energy consuming device that is connected, either because it must be "on" all the time, or because it is already controlled by some other mechanism (for instance a thermostat and/or relay), or because the level of power consumption is high enough to cause a control capability to be too expensive or inappropriate.

Wall switches for controlling lights are also convenient and effective locations for mounting video security cameras. There is usually a wall switch at the entrance to a room and usually it has a relatively commanding view. The easy proliferation of video cameras throughout a home or building, by way of installation at existing junction boxes, has considerable security benefit. In particular, such a system could allow a Security Company or even the Police to view inside and around the home or building in the case of an alarm being set off, so that a "false alarm" condition can be determined without having to visit the location.

Wall switches are also convenient locations for incorporating intercom functionality. Wall mounted power plug receptacles typically have a high degree of proliferation within any room as a result of convention and also building codes. Power plug receptacles are therefore especially useful for gathering temperature information since their proliferation allows gathering a thorough profile of the temperature distribution within any room.

Power plug receptacles are also very convenient locations to offer network connection jacks where any computer or network compatible device or appliance may be attached. They are also convenient locations for adding motion detectors in order to provide a proliferation of detectors in order to enable thorough coverage of rooms not easily covered from a single vantage point.

EMAC points dealing specifically with electrical power consumption may also be added to the electrical breaker box by:

1) Retrofitting EMAC capability into an existing breaker box.
2) Adding smart (EMAC enabled) breakers to an existing box, or
3) Having a replacement breaker box that has EMAC points added in series with conventional breakers.

To effectively provide the aforementioned "biofeedback capability" for energy consumption, this invention offers two forms of feedback—local/instant feedback at the point of use, and general profiling over both time and space provided to the user by software which typically runs on a central PC or Residential Gateway. To assist in creating an overall multi dimensional model for a home or building, capabilities are also described that enable either automatic or semiautomatic identification of EMAC points and their location within the home or building.

To allow a more effective, efficient, and intelligent control of thermal energy utilization, the concept of collecting temperature information in a highly distributed manner is also utilized to enhance the capabilities of the traditional thermostat transforming it into a "smart", network enabled thermostat.

BRIEF DESCRIPTION OF THE DRAWINGS

The present invention is described with respect to particular exemplary embodiments thereof and reference is accordingly made to the drawings in which:

FIG. 27 shows how assemblies including EMAC points can be serialized by use of a scanned, programmable wiring matrix implemented on a PCB (Printed Circuit Board).

FIG. 28 shows an EMAC point that functions as an extension to an electrical junction box, providing a re-creation of the junction box interface, and including a video camera and motion detector.

DETAILED DESCRIPTION OF THE INVENTION

Figure 1:
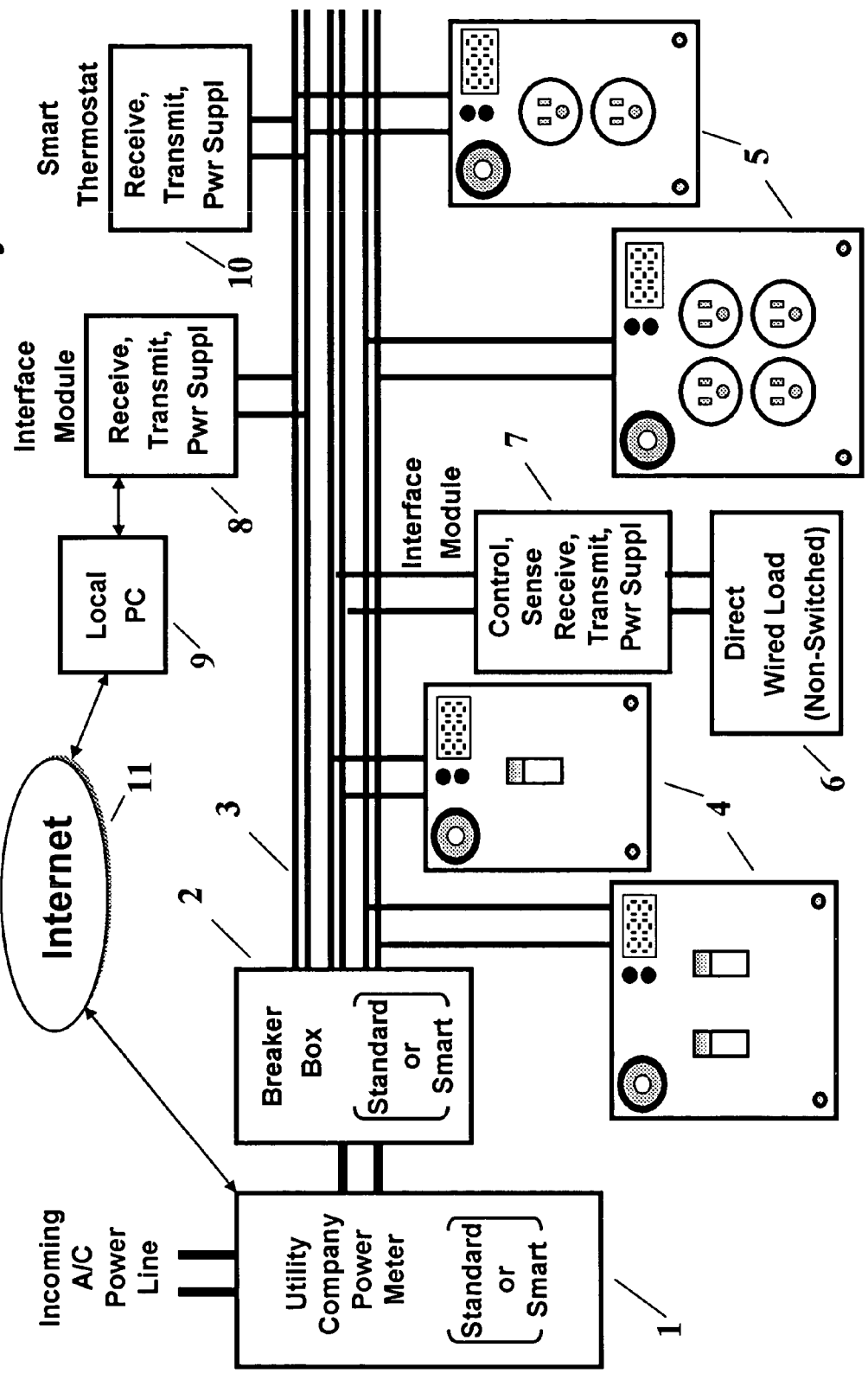
FIG. 1 shows an overall system view including power distribution, communications circuits and connectivity, central controlling elements (local PC or Residential Gateway, smart thermostat) and various forms of EMAC points.

The diagram of FIG. 1 shows an architectural overview of how the present invention might be implemented in a typical home or building. The incoming AC power line passes through the Utility Company meter 1 on its way to one more breaker boxes 2 before being generally distributed throughout the home or building through conventional power wiring 3. Throughout the home/building there are user-accessible, electrical junction box power access locations such as wall switch assembly 4 and power plug receptacle assembly 5. In addition, there are power-consuming devices 6 that are directly connected by way of interface module 7. Some, most, or all of these power connection locations can be implemented, within the scope of this invention, incorporating Energy Monitoring And Control (EMAC) points. Each EMAC point contains at a minimum an energy sensing capability (electrical, thermal, or both) and a digital communications circuit enabling communication with a central intelligence such as a local PC 9 (personal computer) or Residential Gateway residing in the same home/building. Note that throughout this document, "local PC" is considered to be synonymous with "central PC" and "Residential Gateway" in that they all represent a form of centrally located intelligence that may perform analysis, control, and communications functions. In today's vernacular, a Residential Gateway is considered to be always in the "ON" condition and provides a constantly available connection to the Internet 24/7 (24 hours a day and 7 days a week). Depending on the particular installation, a local PC can be "ON" for 24/7 and also perform this function. Alternately, there may be an additional device that specifically performs the Residential Gateway function shown as local PC 9. Note that a "smart" thermostat can also be a form of "centrally located intelligence" that communicates with EMAC points.

Note that from the perspective of an EMAC point, a local PC, a Residential Gateway, a Smart Thermostat, or a device located somewhere on the Internet, as well as other EMAC points, are all considered "remote devices". Also, much of the functionality attributed to local PC 9 can also be performed by an intelligent device located at a different physical location and connected via the Internet by way of local PC 9 or some form of Residential Gateway.

In addition to these basic capabilities, EMAC points can incorporate a number of other additional functionalities, all of which will be described herein. Also, although most figures describing the capabilities of EMAC points show current sensing as the means to measure electrical power consumption, it is understood that to compute the true power consumption, the voltage must also be known. If it is desired to measure power consumption in an accurate manner that correlates with the Utility Company power bill, then the voltage measurement used for computing power consumption should be made as close (from an electrical resistivity standpoint) to the Utility Company power meter as possible. Where any EMAC capability is included at the primary breaker box location, a voltage measurement on the input side would be a good location.

Although not strictly limited to power lines, communication between EMAC points will typically be carried out by signals sent over power lines since this medium is obviously convenient at any junction box power connection location. Where electrical devices are directly wired (not plugged-in or switched), interface modules 7 may be inserted to allow the EMAC function to be performed. Other possible locations to insert EMAC functions include light bulb sockets, circuit breaker boxes, and circuit breakers themselves, just to mention a few). Although power line communication is a focal point of this invention, depending upon the evolution of data communication technology for the home or building environment, it may become suitable to utilize other forms such as Wireless Communications in the future. It may also be that some forms of information, such as video in its analog form, may be better suited to a wireless transmission. Also, for systems implemented in office buildings, it may be convenient to communicate by way of pre-existing network connections such as Ethernet.

Another interface module 8 is used to connect between the power lines and a local PC 9 to enable the communication function to be performed. Other intelligent devices may also connect to this power line-based networking capability. In addition to the smart thermostat 10 shown in FIG. 1, this networking infrastructure backbone for the home/building can also be used to implement capabilities in the area of home surveillance, home entertainment, or simply connecting computers so that they may exchange data or connect to the Internet 11. Although throughout the description of this invention, reference will often be made to communication between EMAC points and a local PC 9, it is understood that with the necessary functionality incorporated into an EMAC point, this communication could instead transfer information directly between an EMAC point and a website or other entity via the Internet. EMAC points can also be capable of transferring information among themselves, without having to communicate with any central form of intelligence such as local PC 9, a Residential Gateway, or the Internet 11.

EMAC Points

Energy monitoring, local feedback, data transmission/reception and control, along with other functions (such as video surveillance and/or motion detection, and general-purpose network connections), can be included at a variety of locations within the home/building. A few examples include conventional electrical junction boxes where wall switches, power plug receptacles, light bulb sockets, and other power consuming and/or power-controlling devices may be installed. Other possible locations for installing EMAC functionality include circuit breaker boxes, or circuit breakers themselves.

Figure 2:
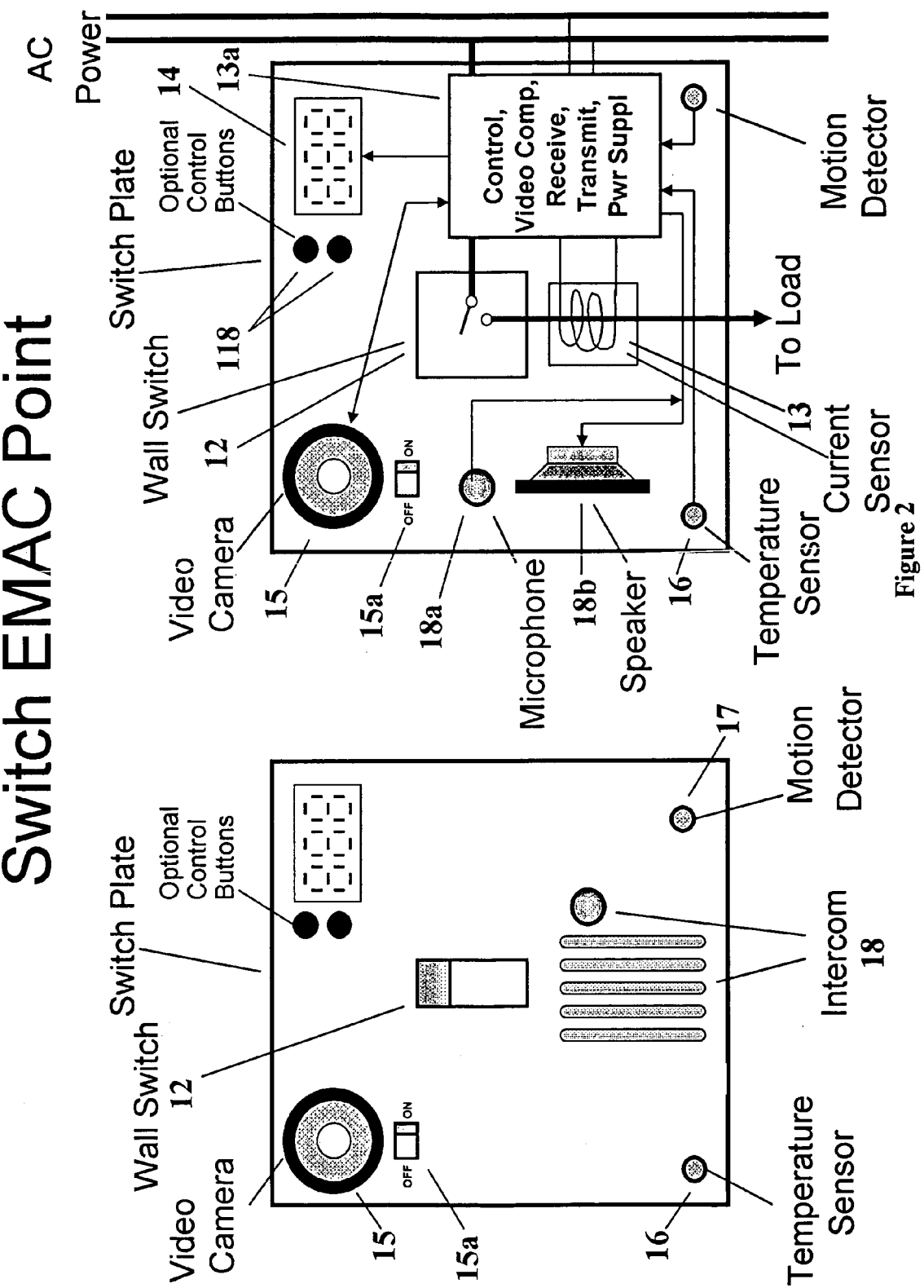
FIG. 2 shows a typical wall switch assembly including an EMAC point.

FIG. 2 shows how a replacement light switch assembly 12 attached to an electrical junction box might be implemented to include EMAC functionality. A current sensor 13 measures the power to the load. These sensors can use any of a number of known technologies including inductive or resistive (current shunt). An optional control unit (if present) can optionally turn the power on/off or dim (for lights) in response to a remote command, or can effect various forms of local control for dimming (for lights). Such control modes and others, as well as their implementations—(often relying on SCR (Silicon Controlled Rectifier) devices—are well known in the art. Also, various interactions that may take place between a remote device (local PC 9, a smart thermostat, or some remote device communicating via the Internet 11) and a wall switch EMAC point will be discussed later. The implementation of any EMAC point that includes a switch should always include a means for sensing the switch position (open or closed), regardless of whether or not current is flowing through it. There may be circumstances where a control element in the EMAC point has blocked electrical current from passing through the switch, however it is necessary for the position of the switch to be communicated back to local PC 9 or to some other networked device.

Where a power control function is included in an EMAC point, it is important that the EMAC point operate consistently and predictably, even when the power to the home or building fluctuates or goes off and on, or when a problem arises with a remote device that may issue control commands to the particular EMAC point. A "power-on-reset" circuit should be included to insure the EMAC point never gets "confused" by power fluctuations. Also, when the EMAC point is operating in a mode where its function is being controlled by local PC 9 or some other remote device, the EMAC point may, from time to time, poll the remote device to ensure that the communications link (and the remote device) are still functioning properly. If the remote device did not respond, indicating a possible problem, the EMAC point should switch to its default mode—for instance, if there is a light switch, the power should be applied according to the position of the switch.

The multi-digit display 14 shown in FIG. 2, as well as the displays shown in the many other figures included herein, may be used for many different purposes. A few examples are listed below:

1) Identify to the user the particular switch or outlet assembly and the individual switches/outlets/devices within the assembly
2) Display the current or power (KW/time) being used by the load at a switch, outlet, device, or breaker.
3) Display the cost per time of operating the load attached to a switch, outlet, device, or breaker.
4) Display any mode-related information in response to the optional mode button(s), in response to voice commands, and/or in response to the central PC.
5) Display the temperature recorded by the temperature sensor.
6) Provide feedback for calibration of the temperature sensor, the optional video camera, or the optional motion detector.

FIG. 2 also shows an optional video camera 15 as well as temperature sensor 16, motion detector 17 and intercom capability 18 comprising microphone 18$a$, and speaker 18$b$. Some implementations may allow a single transducer to be used for both the microphone and speaker. Circuit 13$a$ shown in FIG. 2 includes a digital communications circuit containing all functionality necessary for data transmission and reception. Circuit 13$a$ also contains the power supply necessary to power any circuitry within the assembly from the available AC power located within the particular junction box, as well as any power control circuitry for an electrical load connected to the assembly. In addition, 13$a$ contains all display driver functionality as well as any circuit functionality necessary to interface with the optional video camera—including video digitization and compression functionality. Various functionalities for video digitization and compression are well known in the art.

Figure 3:
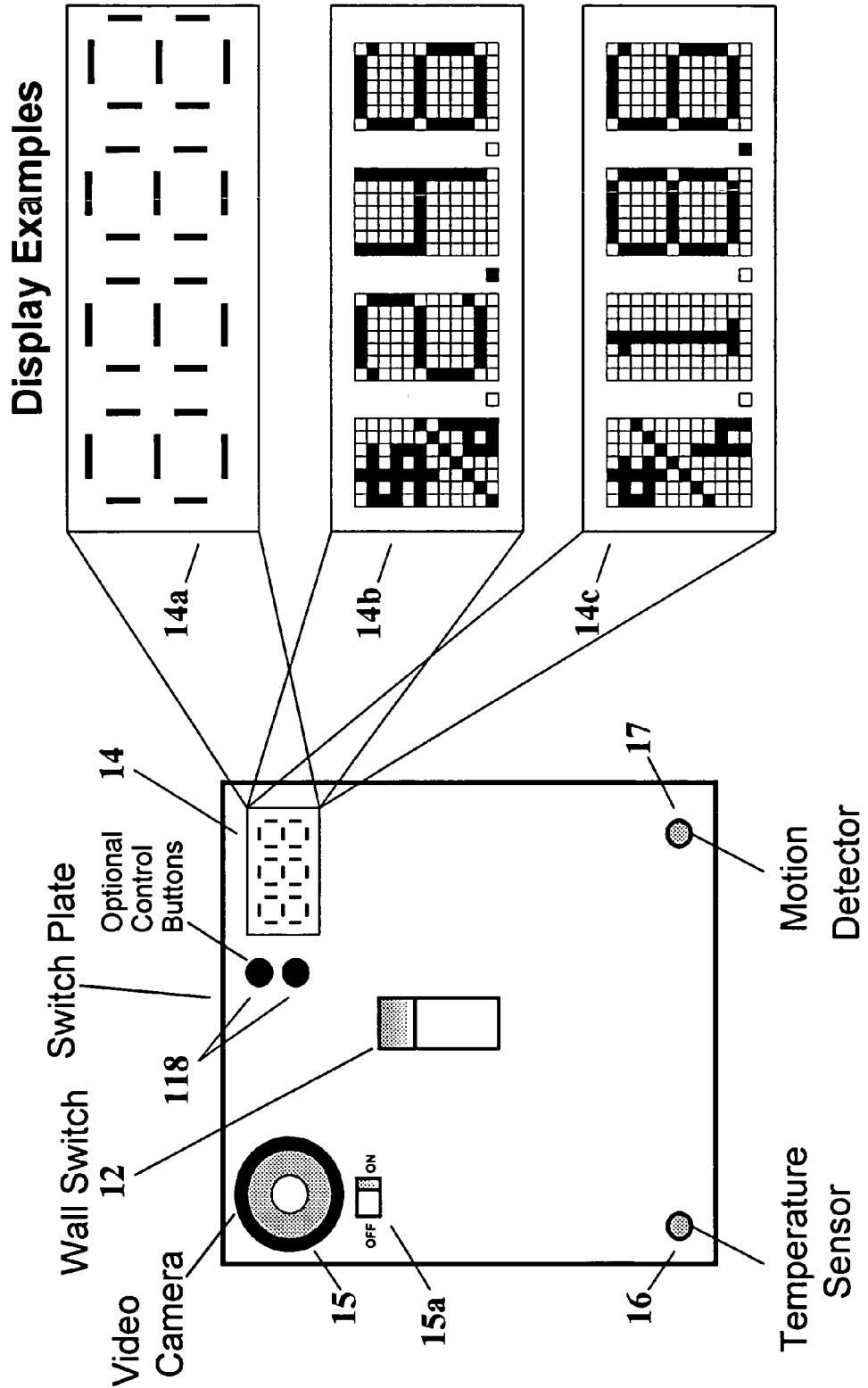
FIG. 3 shows a wall switch assembly including an EMAC point with a variety of display formats for direct visual communication of energy consumption.
Figure 4:
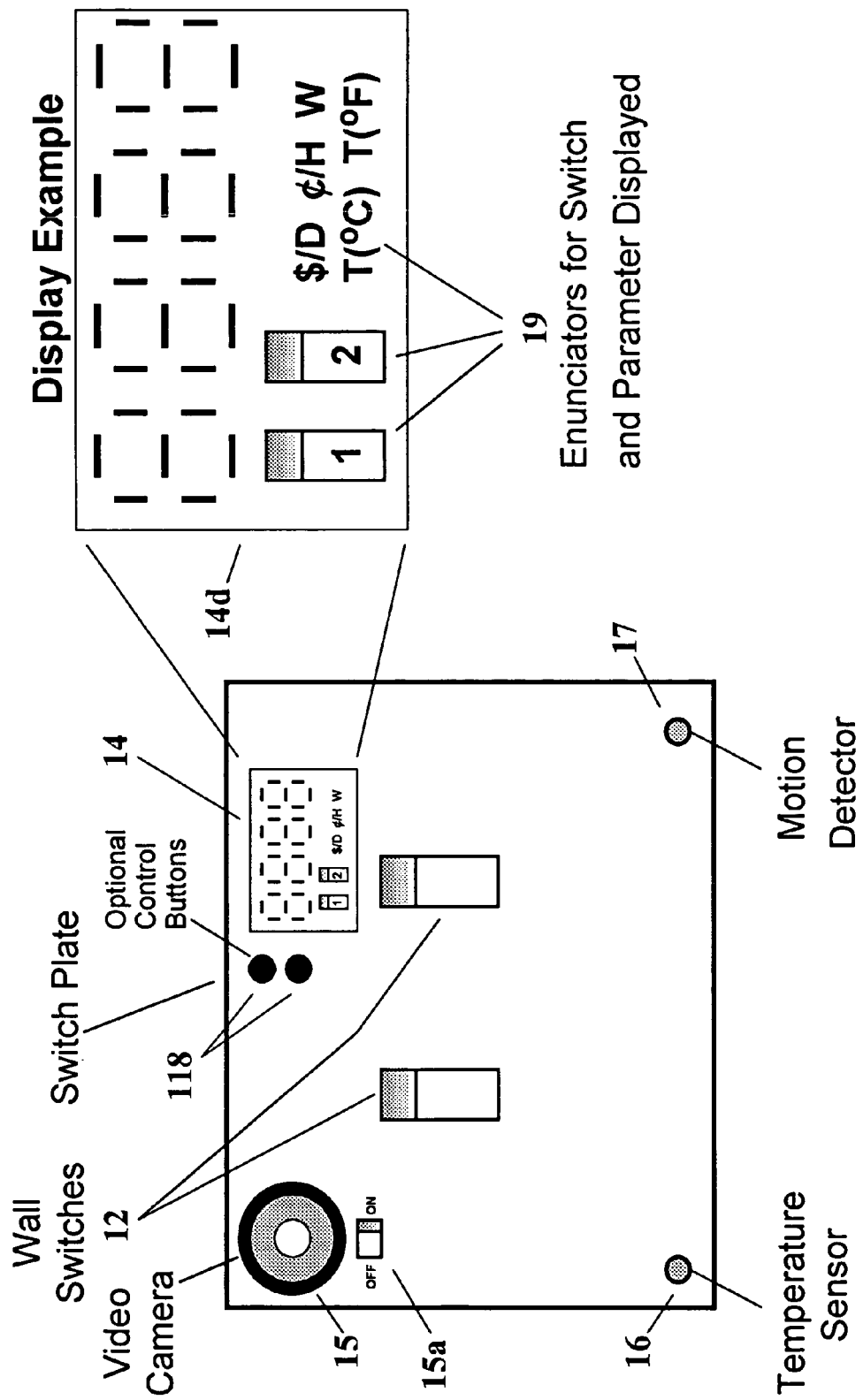
FIG. 4 shows a wall switch assembly including an EMAC point with an alternative display format for direct visual communication of energy consumption and local temperature, including a data read out and a suite of enunciators.

FIG. 3 and FIG. 4 both show possible implementations of this local display. In the case of electrical energy consumption, the purpose of these displays is to provide instant visual feedback to the user on energy consumption at the point of use. When displaying temperature, these displays are a guide to thermal energy efficiency by showing the user instantly where certain areas of the home/building have been made overly hot or overly cool beyond what is desired or necessary thereby consuming excess and therefore wasted energy.

These local displays may have any number of digits, depending on the specific requirement. The multi-digit display need not only be of the seven-segment variety as shown in enlarged view 14$a$. One or more of the digits could be alphanumeric (either with additional segments, or a full matrix as indicated by 14$b$ and 14$c$ [e.g. 5×7, 7×12, etc.]). Utilizing more than a simple seven-segment capability may provide a more informative and intuitive user interface. This may be especially useful in displaying symbols like "$" or "¢" in the scenario described below.

A key element of this invention is related to display purpose number (3) listed above ("Display the cost per time of operating the load attached to the switch, outlet, device, or breaker."). The local PC 9 (or Internet 11 directly) can supply the current cost per unit of energy (kW, Therm, etc.) for the consumer's home/building which, in turn, is used to convert the energy consumption level to a cost-per-time parameter, for instance $/month. Energy cost parameters can be automatically accessed from time to time over the Internet. (Energy cost parameters could also be accessed directly over the Internet by an EMAC function, if this EMAC function was designed to incorporate enough intelligence to directly access the Internet.) The energy consumption value at the point of use is then displayed on the switch panel thereby providing instant feedback to the consumer. The conversion calculation from "current consumption" to "cost per time" can be performed in the local controller at the switch or at local PC 9. FIG. 3 shows how another alternate form of the local display can be implemented.

In addition to the forms of display shown in FIGS. 3 and 4, it is also possible to utilize a generalized LCD matrix display (discussed later with reference to FIG. 26) similar to those now found in small wireless communication devices and/or hand-held video games. Incorporation of an LCD matrix display would allow a full motion video image to be shown, further enhancing the overall system capability by allowing the user to view images being recorded at cameras elsewhere in the home from any room having an EMAC point with such an LCD matrix display. Since it is possible according to this invention to also add surveillance cameras which observe activity around the exteriors of the home, this capability to add video-capable LCD displays to EMAC points is also useful to enhance the security/surveillance capabilities of the overall system.

Both FIGS. 2 and 3 show optional control buttons 118 that can be used to determine the form of the information displayed, and/or affect the operation of an EMAC function. An alternative to using any control buttons on an EMAC point and a way of adding additional functionality is to incorporate a voice recognition technology into the system. This recognition function can be performed by hardware and software contained within the EMAC point. Alternately, it can be performed without adding additional hardware cost to the EMAC point itself by utilizing the microphone, such as that required to implement intercom 18 in FIG. 2. This microphone will receive voice information that in turn can be digitized and sent to local PC 9 for analysis. Voice recognition software is well known and can be trained to respond well to the voices of the home's primary occupants. This incorporation of voice recognition software can be used for a variety of purposes in conjunction with EMAC points including remote control of functionality at the particular EMAC point receiving the voice command or alternately controlling other EMAC points within the home. Control of any Home Systems functionality by a user interfacing with a particular EMAC point can alternately be accomplished by some form of remote control receiver—either IR (Infrared) or wireless—that is incorporated into an EMAC point.

The display incorporated into an EMAC point can also be used for displaying the temperature or other parameters. Where more parameters are to be displayed than there are digits or space available, the display can alternately display different parameters in multiplexed intervals. This is also the methodology shown in FIG. 4 for displaying the power consumption for each of multiple receptacles. Enunciator LEDs could be used or, if necessary, an additional digit can be added to indicate the position of a particular receptacle whose parameter is being displayed at the moment. To indicate what type of information is being displayed and/or what units of measurement are being displayed, other forms of display means can be used. For instance, enlarged view 14d of display 14 in FIG. 4 shows that multiple enunciator icons 19 representing parameters or identifying power consuming loads (switches, outlets, etc.) can exist on the display. The appropriate one(s) of these enunciator icons are then illuminated/highlighted depending on what energy or temperature information is being displayed at the moment. The display technology can be LED, LCD, gas discharge, or any other available and appropriate technology. Depending upon the display technology chosen, an additional display driver chip may need to be incorporated into the EMAC function.

Also shown in FIG. 4, are a number of optional functions including temperature sensor 16, video camera 15, and motion detector 17. If motion detection is desired, it can be done through a standard sensor (usually IR), or could alternately be performed by image analysis performed on the video image either locally or remotely. Each method has advantages and disadvantages.

The easy proliferation of video cameras throughout a home or building, by way of installation at existing junction boxes, has considerable security benefit. Since video camera 15 is connected to local PC 9 through a communications link, it can be viewed remotely via the Internet after the video information has been digitized and compressed. The video camera can be statically mounted and include a wide-angle lens and manually operated gimbal capability. Optionally, the video camera could include a motorized gimbal to allow remotely controlled movement (even via the Internet). In many instances, it may be desirable to include On/Off switch 15a to control video camera 15 such that the camera may be turned off when privacy is desired. Information regarding the position of this switch may also be made available through the communications link to local PC 9 and/or a remote device on the Internet.

Regardless of how the video camera is controlled, images that have been transferred to the central PC can also be automatically moved to an off-site web/domain server for storage. Thus, if the surveillance camera detects and captures images of an intruder or some important event, the images will be preserved even if the PC in the home/building is damaged, destroyed or stolen. A buffer of the video surveillance information storing video information for some fixed period of time into the past, can be stored at an off site location, via the Internet. In a mode where the system is armed for intruder detection, or alternately tied into a conventional security system for intruder detection, and an intruder is detected; this historical buffer of the information can be preserved to aid in the identification of the intruder and the recreation of the event. Any video information moved offsite is probably encrypted to ensure the privacy of the occupant.

The detection of a possible intruder can be performed by the elements of this invention, by a separate conventional security system, or both working together. Given the inconvenience and expense of false alarms, the distributed video capability of this invention, made easier to implement due to its installation and communications through existing junction boxes, could allow a Security Company or even the Police to view inside and around the home or building in the case of an alarm being set off, so that a "false alarm" condition can be determined without having to visit the location. To make such a capability acceptable to the occupant, especially in the case of a residence, it would be imperative that there exist a privacy mechanism (in software) such that the local PC or Residential Gateway does not allow any viewing by the Police or Security Company unless an intruder detection alert is in progress.

In general, transmission and storage of video information can be based on motion information derived from the motion detectors in each room. If no motion is occurring, storing a static snapshot taken at regular intervals may be completely adequate. When motion is detected, the video information from that area of the home or building can be recorded completely and buffered. A remote interface via the Internet coupling into this Home System can show a plan of the home or building, wherein the user can see a two dimensional map of where motion has been detected and also see the most recent snapshots (in small "thumbnail" pictures) allowing the user to click on a room or camera location and immediately see the live action video from that location.

Depending on the available bandwidth of the connection in the home/building between the video camera and local PC 9, it may not be necessary to have full speed/live action video to serve a useful purpose. Even a "jerky" picture or one with reduced resolution may still constitute a very useful function if it is available at a significantly lower price and if the low price allows a much more prolific deployment throughout the home/building. Also, regardless of the bandwidth available to transfer digitized video images to local PC 9 or directly to the Internet, the cost of the video camera may be significantly reduced (with a corresponding reduction in image quality) by using a newly available video sensor technology. Here, video sensor arrays can be constructed on a standard CMOS semiconductor process and potentially integrated onto the same chip with other functions required to implement the various features of an EMAC function. It may also be acceptable to use black & white video if it is available at a much lower price than color.

Figure 8:
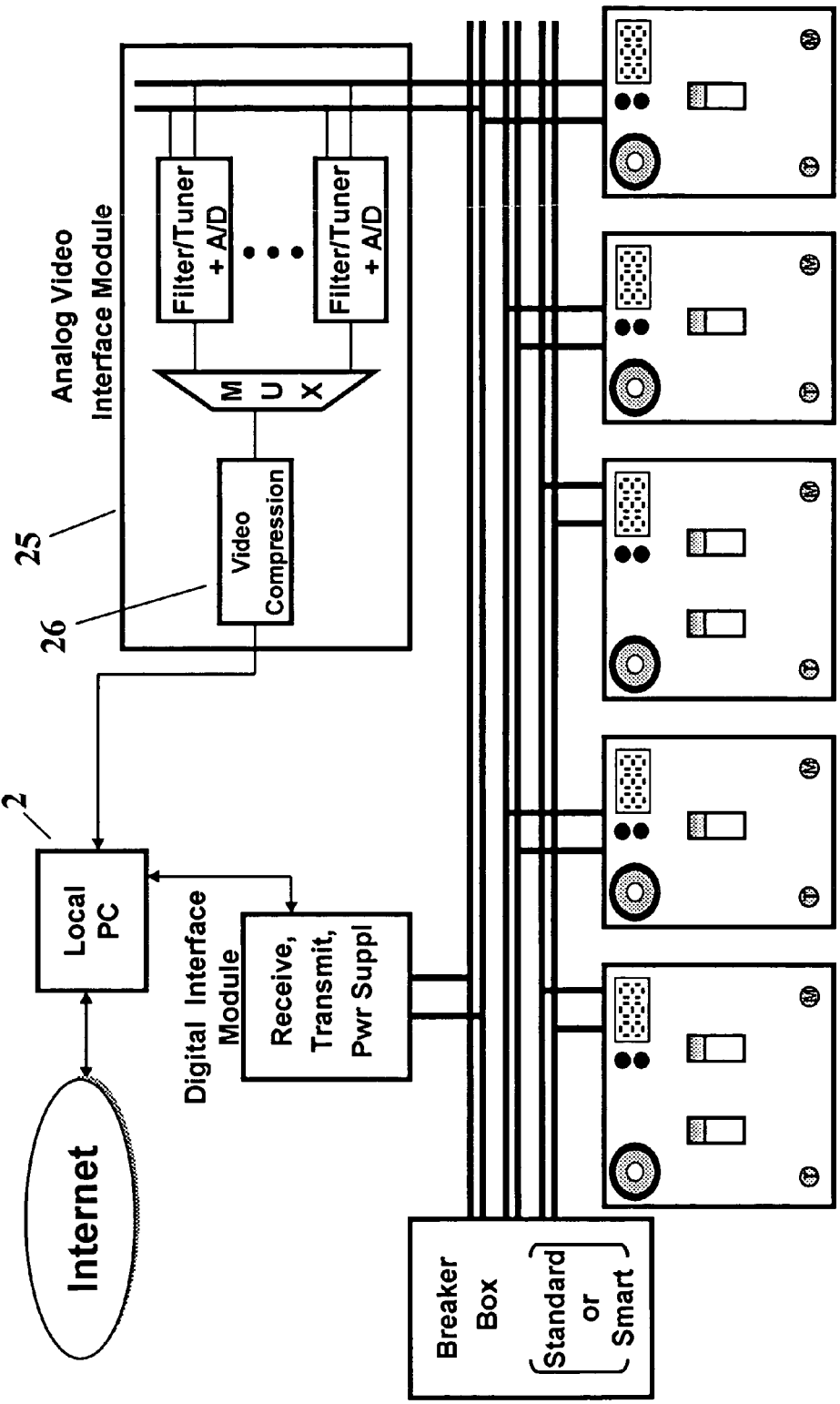
FIG. 8 shows one form of connectivity for video surveillance where video information is transferred from EMAC points to a central location in the analog format, and are digitized and compressed at that central location before being supplied to the local PC.

An alternative mechanism for sending video information from an EMAC point to local PC 9 and the Internet may include analog video transmission from the EMAC point to a device, located near local PC 9, which receives, digitizes and optionally compresses the video as will be shown in FIG. 8.

Figure 5:
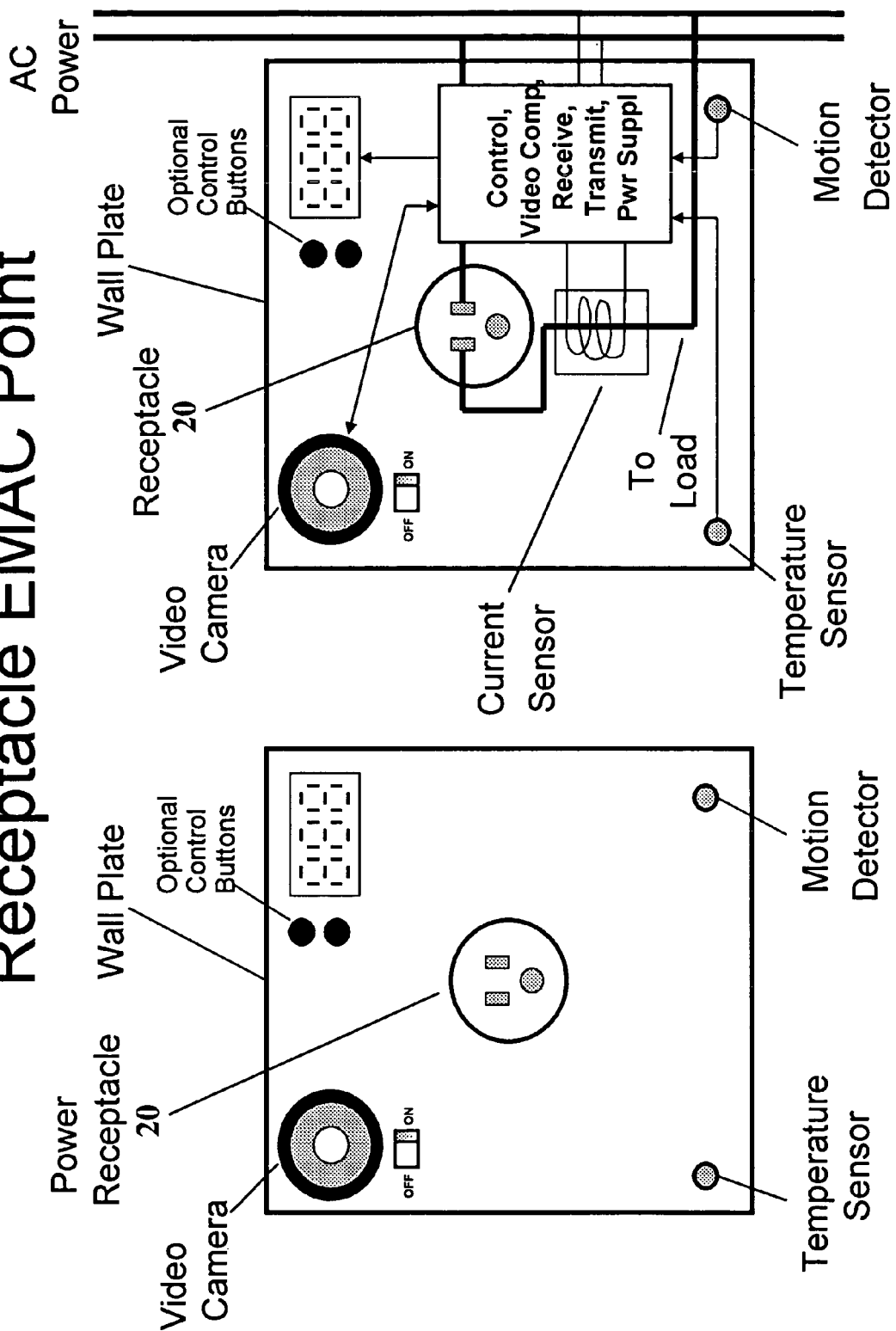
FIG. 5 shows a wall-mounted power-outlet assembly including an EMAC point.

FIG. 5 shows an EMAC configuration similar to FIG. 2 except that it describes a power plug receptacle assembly, containing at least one receptacle location 20, instead of a switch. FIG. 5 also includes an optional video camera 15. Note that according to this invention, any electrical junction box is a possible location for installing a video camera, and that when installed, the camera can be powered by the source of AC power available at the junction box, and the video signal, after being digitized and compressed, may be transmitted digitally by way of the available power connection to local PC 9 or some other remote device.

Figure 6:
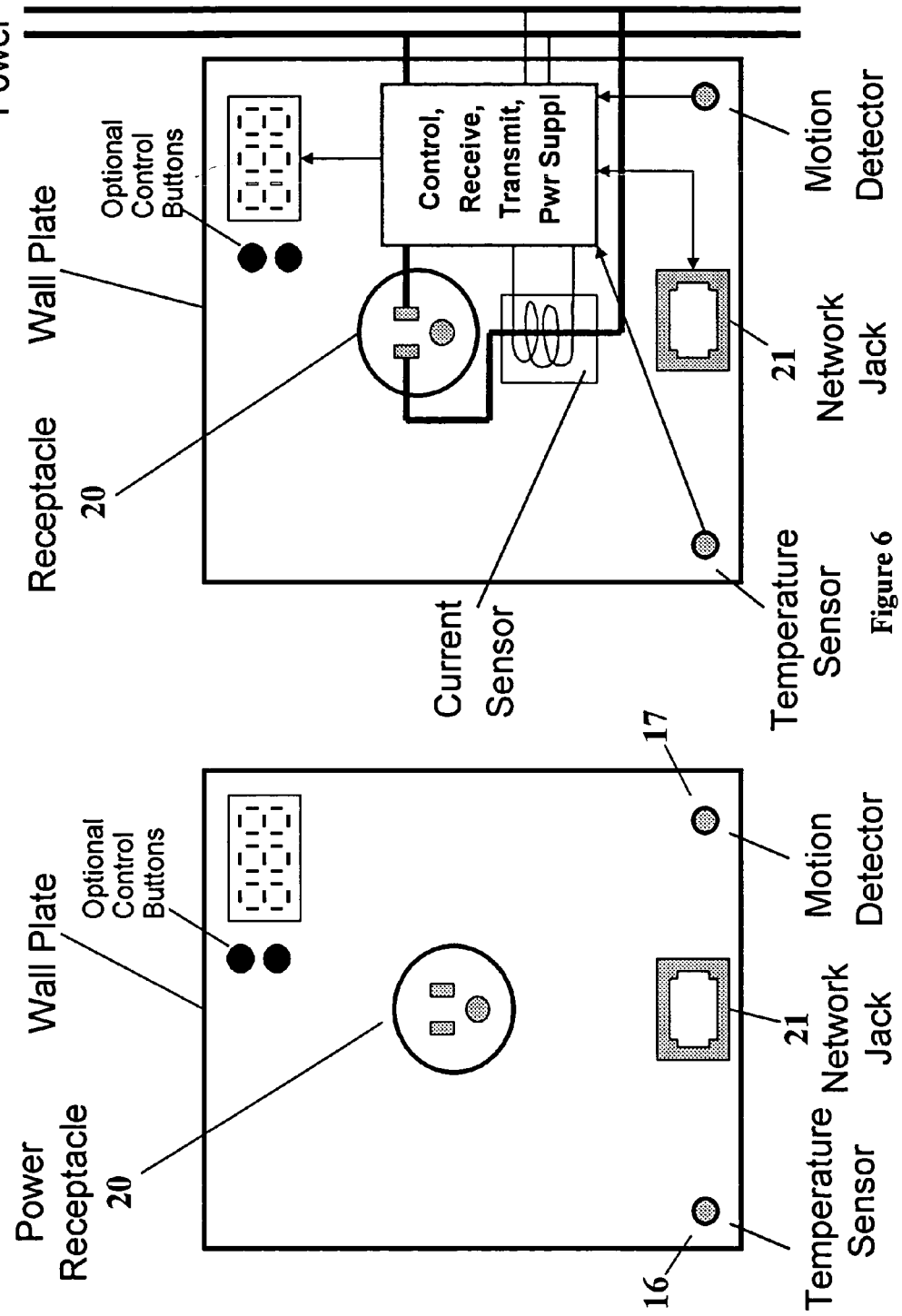
FIG. 6 shows a wall-mounted power-outlet assembly with alternate functionality.

FIG. 6 shows a power receptacle assembly similar to FIG. 5 except that optional network connection jack 21 is included. This network connection jack can offer standard Ethernet compatibility. If the type of data transmit/receive link used to transfer information to/from the EMAC point and local PC 9 possesses a bandwidth capability compatible with normal network data, it may be convenient and useful to include this conventional network connection jack as part of the power receptacle assembly. Power receptacles are the most proliferated form of wired connection points within any home or building.

Also shown in FIGS. 5 and 6 are motion detectors 17. These can be especially useful in filling in the "blind spots" that occur if the only motion detector controlling a light is located in the wall switch assembly. To avoid unwanted detection of pet movement, the lenses for the motion detectors on power plug EMAC points can be fashioned so as to look to higher elevations for motion. Since power receptacles are so proliferated, using these locations for installing EMAC points provides a very thorough picture of temperature, motion, and even video, within the home or building.

Also shown in FIGS. 5 and 6 are circuits for controlling the power available at receptacle 20 in response to commands received from a remote communications link. In some implementations of such a power controlling circuit, the maximum allowable power that may be drawn through the receptacle may be artificially lowered by the presence of the controlling circuit. It therefore may be appropriate to provide a physical mechanism for overriding or bypassing the power controlling circuit such that the maximum allowable electrical current level for the plug receptacle is not artificially lowered.

As an alternative to the wired Ethernet connection shown in FIG. 6, a different connection methodology to allow devices or appliances within a particular room to communicate with an EMAC point for data communications would be the addition of a wireless transceiver to the EMAC point. This can be done by having a small, optional module that plugs into a connector on the EMAC point, deriving power from, and communicating with the EMAC point, while communicating in a wireless manner with other devices in the room. An example of such a wireless technology is that currently referred to as "Bluetooth". Many wireless technologies have a limited range within which they can operate reliably, for instance 10 to 30 meters. The range of wireless technologies can vary considerably, especially within a home environment, depending upon the number of walls the signal must pass through and the structural content of each particular wall. Within a particular room, however, wireless technology can be very convenient, especially when interfacing with a portable computer or entertainment equipment. An example of a wireless communication module attached to an EMAC point is module 65 shown in FIG. 21.

Figure 7:
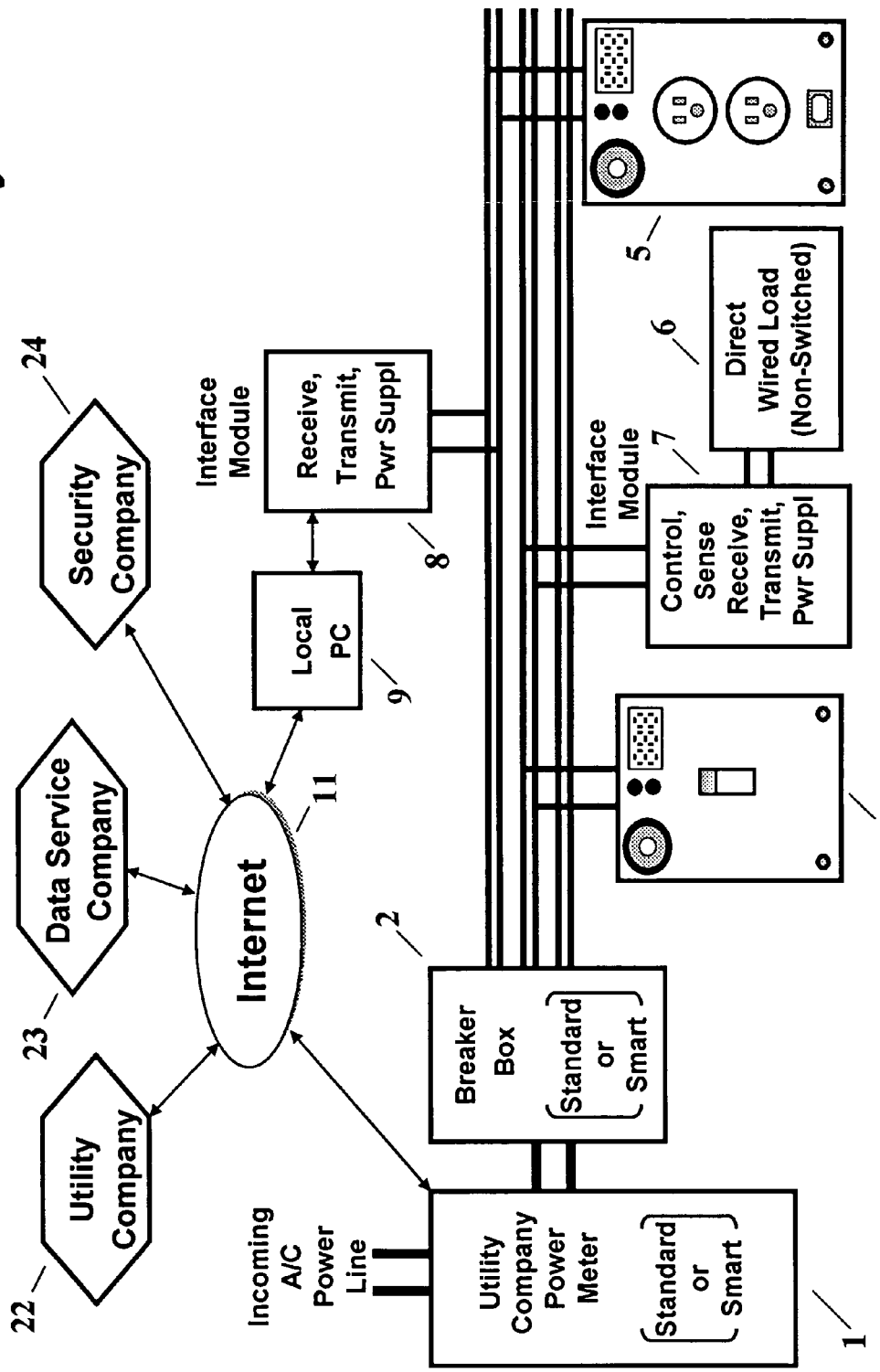
FIG. 7 shows an overall system view with emphasis on connectivity through the Internet between the local system and utility companies, security companies, and a data service company supplying information to specifically support the configuration of the particular local system.

FIG. 7 shows a possible overall connection scheme for a home/building according to this invention where all EMAC points can connect with local PC 9 that, in turn, communicates via the Internet 11 where a central source of information will supply energy cost rates and other utility-related information. The central source of information could be a Utility Company 22 or a third-party supplier such as Data Service Company 23. Information may also be transferred to and from a Security Company 24 such that any security related information such as surveillance video, motion detector outputs, or window/door open detection indications may be viewed at the Security Company.

Figure 10:
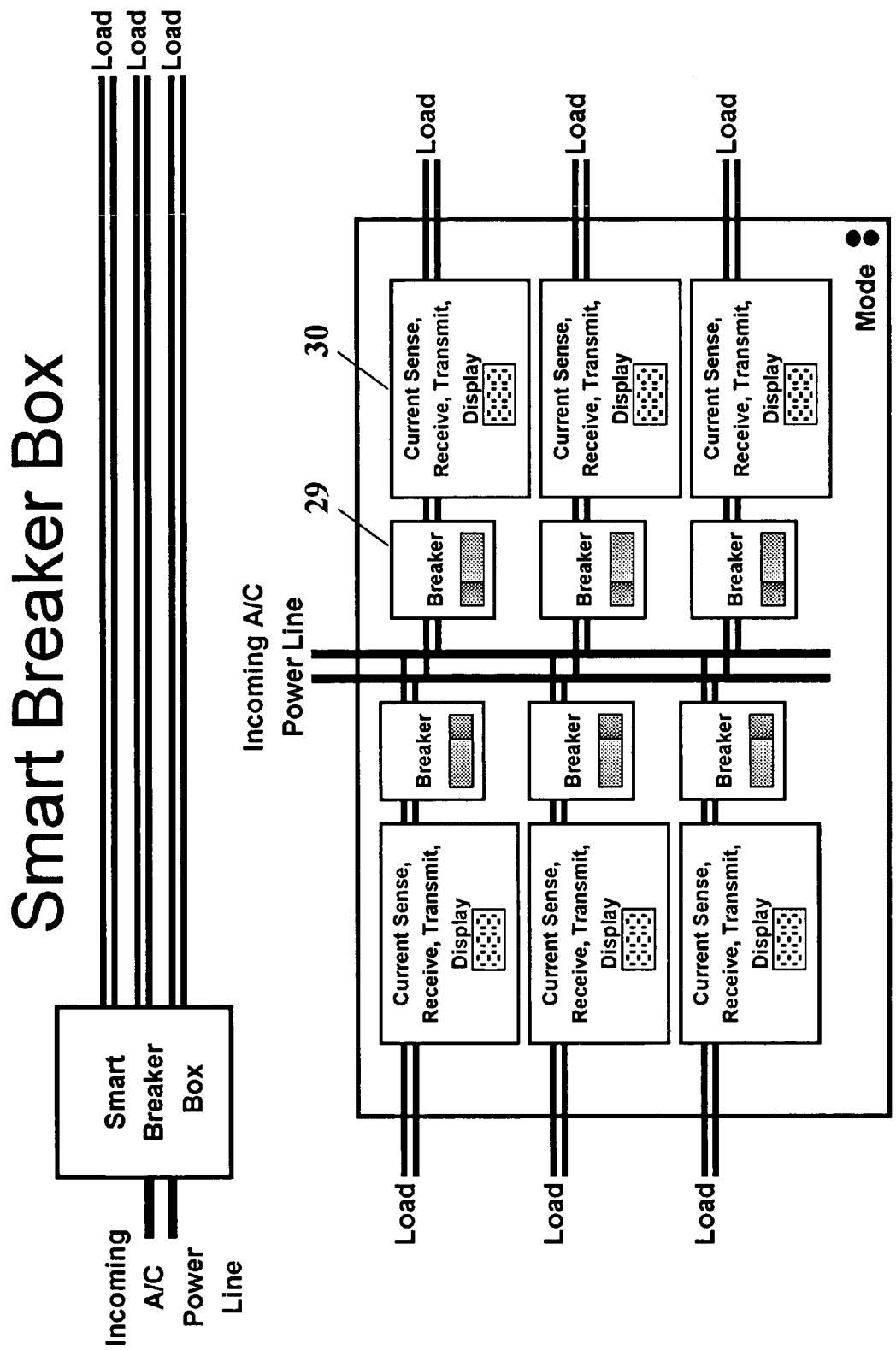
FIG. 10 shows a smart breaker box where a form of EMAC point is used in conjunction with conventional breakers to determine the amount of electrical current being consumed by all devices that are wired to a particular breaker.
Figure 11:
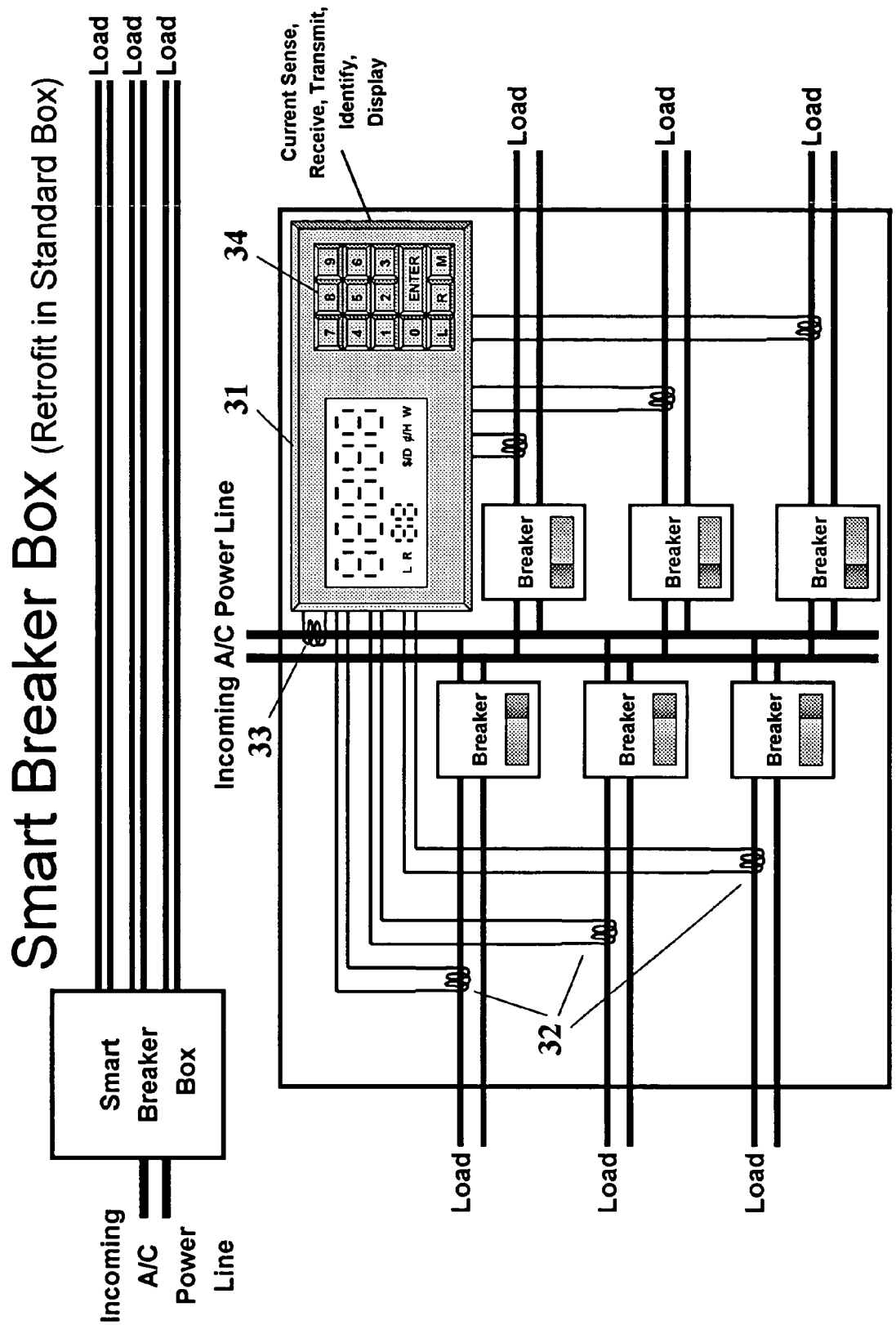
FIG. 11 shows how an EMAC point can be retrofitted in a standard, conventional breaker box, providing sensing of all incoming and outgoing electrical current.
Figure 12:
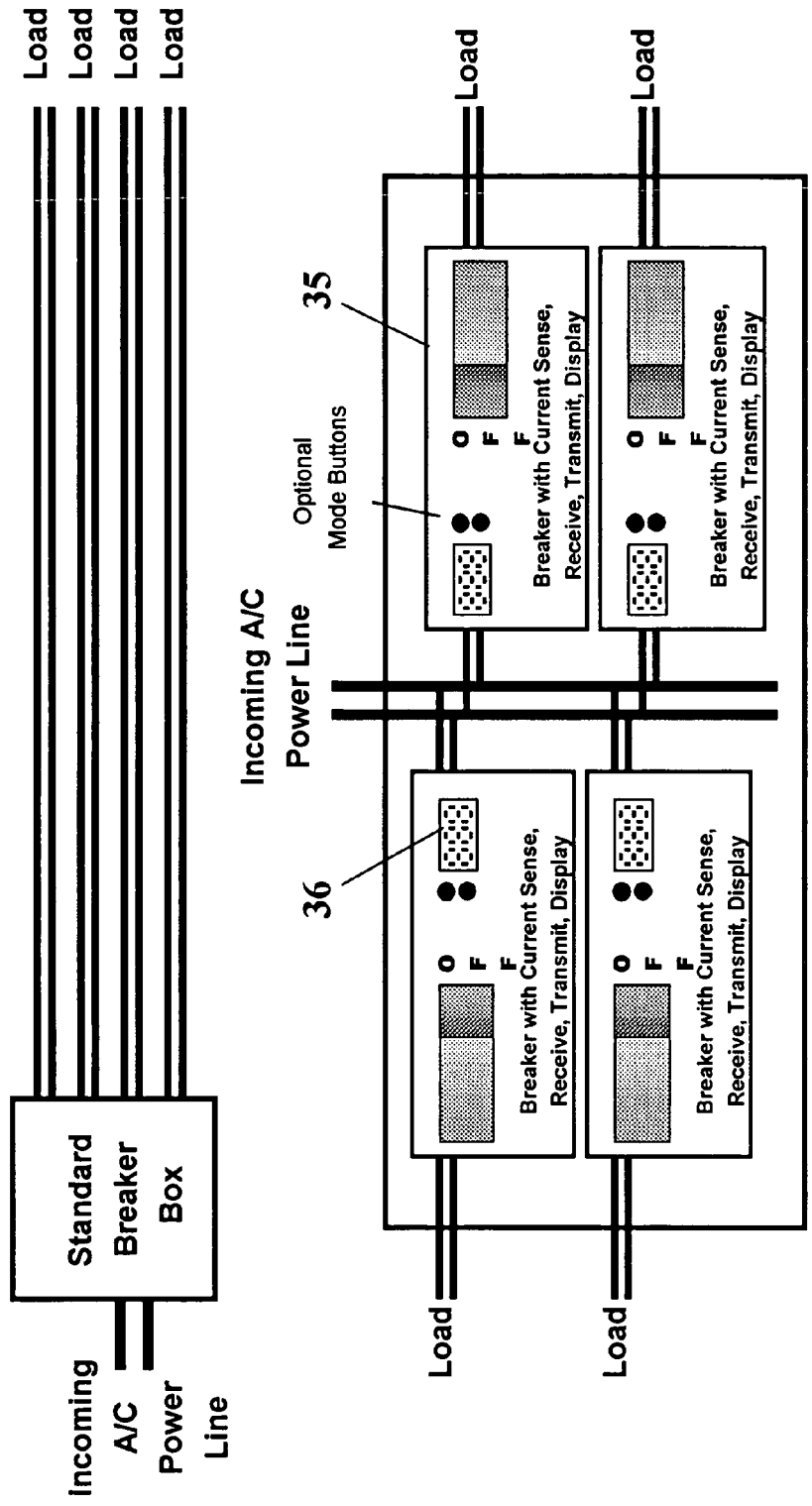
FIG. 12 shows how smart breakers incorporating EMAC points can be retrofitted in a standard, conventional breaker box.

The overall system of FIG. 7 includes wall switches 4, receptacle plugs 5, directly wired loads 6, and breaker boxes 2 (both conventional and "Smart"—per FIGS. 10, 11, and 12). Included in FIG. 7 is the potential for the Utility Companies to provide a "Smart Meter" that would interface with the Internet 11 and could potentially communicate with the system described in this invention. Also, as shown in FIG. 11, a smart breaker box according to this invention can measure the current entering the breaker box and therefore is capable of checking the accuracy of the existing Utility Company meter.

FIG. 8 illustrates the scenario where video information is transferred from cameras contained at EMAC points to a central location using an analog transmission format as opposed to digital. Eventually the cost of converting video information from analog to digital and performing video compression will be reduced to the point that incorporating compression into each EMAC location will be inexpensive. Also, over time, the cost of a high bandwidth connection between EMAC locations will also be greatly reduced. However initially, it may be more cost-effective to transmit information as some form of analog signal to a central location where these signals are converted to digital form and the video compression and/or conversion technology is shared among the different video sources. Such a mechanism for sharing the video compression capability is shown as interface module 25 in FIG. 8.

The video compression function 26 shown in FIG. 8 may also be performed in the local PC 9 if the PC's processing capability is adequate. Also, as described earlier, the determination of which video signal to digitize and compress at any given point in time can be made at the local PC by examining the outputs of the motion detectors at the EMAC points from which the video signals are being sent.

Figure 9:
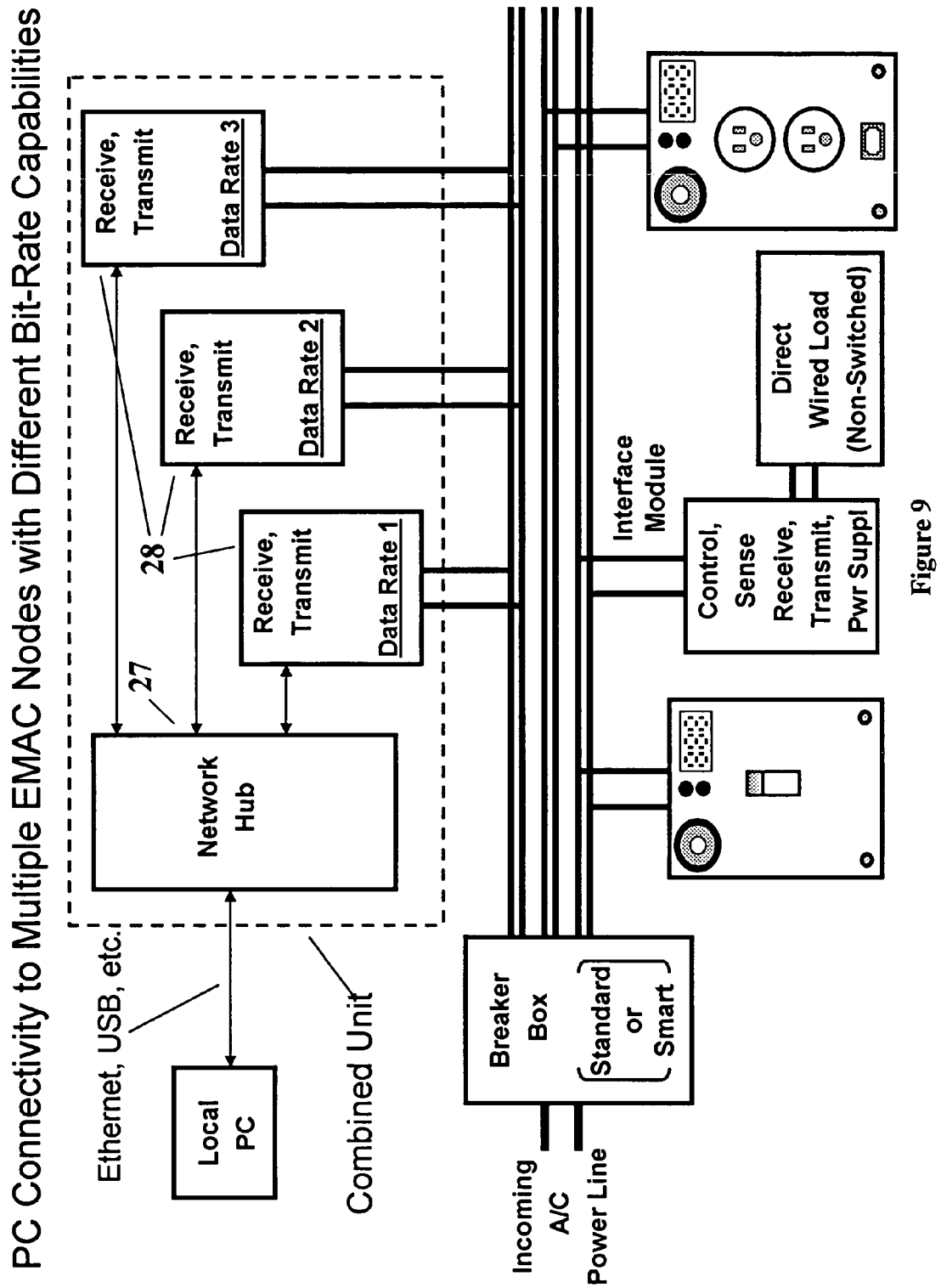
FIG. 9 shows a network hub capability allowing EMAC points having different data rate transmission capabilities to all talk to the local PC.

FIG. 9 addresses the issue of how the data rate capabilities of available EMAC points may increase over time, and how the overall system will cope with this by offering a multi-data rate communications consolidation capability located near the local PC 9. The capability of communicating between local PC 9 and various EMAC points at different data rates is also important since different types of EMAC points may require different data rate capabilities even though they're all being purchased and installed at the same time. For instance, an EMAC point that is controlling and monitoring power consumption and temperature may require only a very low data rate capability. EMAC points that will offer networking connectivity capable of supporting a broadband Internet connection today might require a one megabit per second capability. To offer a normal 10 megabit Ethernet connection capability, EMAC points would obviously need to communicate at 10 megabits per second. To transfer digital video would also require a reasonably fast data rate. The cost of an EMAC point is therefore significantly affected by the data rate it must support, and therefore the most cost-effective overall solution for the home system may be to utilize EMAC points having a variety of data rates. Hence an implementation strategy such as that shown in FIG. 9 containing a form of a network hub 27 and receive/transmit units 28, which may all have different data rates, may be the appropriate solution to the problem.

A modular implementation for hub 27 can be constructed where there exist slots designed to accept cards or modules representing receive/transmit units 28, each of which may have a different data transfer rate capability. Besides having a different transfer rate, such modular receive/transmit units may still each conform to an industry standard for powerline communications. For instance, one might conform to the X10 standard, one to the CEBus standard, and others conforming to newer standards such as those being studied by the Home Plug Alliance organization, or any future standard. Such a modular approach allows the user to mix and match capabilities as required—producing the most cost-effective and conveniently assembled home system. A modular hub assembly as just described would have a host interface circuit that could support a variety of output standards, such as standard Ethernet, USB, and/or any other, and would interface with local PC 9 or a processor performing the Residential Gateway function, or alternately a device located somewhere on the Internet.

FIG. 10 shows a "Smart" breaker box where each breaker 29 has associated with it an EM (Energy Monitoring) point 30. EM points located in breaker boxes typically contain the current sensing, receive, transmit, and possibly display functions, but typically do not perform a control function. Sensing temperature would also not be an appropriate function within a breaker box relative to providing useful ambient temperature readings, since there is usually a natural build-up of heat within a breaker box. However, a temperature sensor might be useful if the user wished to know of the occurrence of an unusually high temperature build-up within the breaker box itself.

Information supplied by these EM points can be correlated with information sent from EMAC points located downstream of each breaker to assist in providing a clear and complete picture of where all electrical power is being consumed within the electrical circuit being served by that particular breaker. For some power-consuming devices that are directly wired, inserting an EMAC point at the breaker location may be the easiest way to retrofit the EMAC capability.

FIG. 11 shows an alternate form of a "smart" breaker box where the current sensing, display and communications capabilities commonly associated with the EMAC points of this invention, can be retrofitted into a standard breaker box. The retrofit EM (Energy Monitoring) control unit 31 supports the connection of multiple current sensing units 32, including current sensor 33 which measures current entering the breaker box from the incoming A/C power line. Keyboard 34 on EM unit 31, if present, aids in the identification of the particular breaker units in the box which is necessary for proper processing of energy related data at the local PC 9, but also useful to aid the user in understanding which breaker relates to which area of their home. It is a well-known fact that in most homes, the correlation between specific breakers and the energy use locations that they supply is typically very poorly documented.

FIG. 12 shows an additional way to provide a similar capability of installing EM capability without having to retrofit the entire breaker box in an existing home/building. Here, the feedback/monitor point functions would be incorporated into the circuit breakers 35 themselves which, in turn, would fit into an existing, conventional breaker box. Obviously, breaker-related EM points would concentrate on electrical current measurement as their primary function. Integrating the EM function into the breaker itself obviously would require a high degree of miniaturization, especially if integral (and optional) display 36 is included.

It should be noted that in FIGS. 10, 11, and 12, all relating to measurement of electrical current entering or leaving a breaker box or other electrical distribution box, that the ability to measure the incoming current with a reasonable degree of accuracy will allow the user to correlate their power consumption with that registered by their utility company's power meter, as reflected in their power bill. Many utility company power meters are extremely old and may not be consistent or properly calibrated, thereby overcharging the user.

Also, relative to the breaker box solutions shown in FIGS. 10, 11, 12, a particular installation may be done such that all of the loads "downstream" of a particular breaker do not include EMAC points. In fact, for some breakers, no EMAC points may exist downstream. In these circumstances, a useful method for identifying the power consumed by connected devices is to establish an "energy signature" for each device by turning on only one at a time, during a set-up/calibration process, and recording the typical energy usage for each device. This "signature" may also include any unique characteristics of the waveform shape for the ramp-up of the instantaneous electrical current consumption, or the effect on the measured voltage waveform at the breaker box, when the device is initially turned on. These "signatures" can later be used for identifying the energy used by particular electrical energy consuming devices when performing an overall profile according to this invention.

Figure 13:
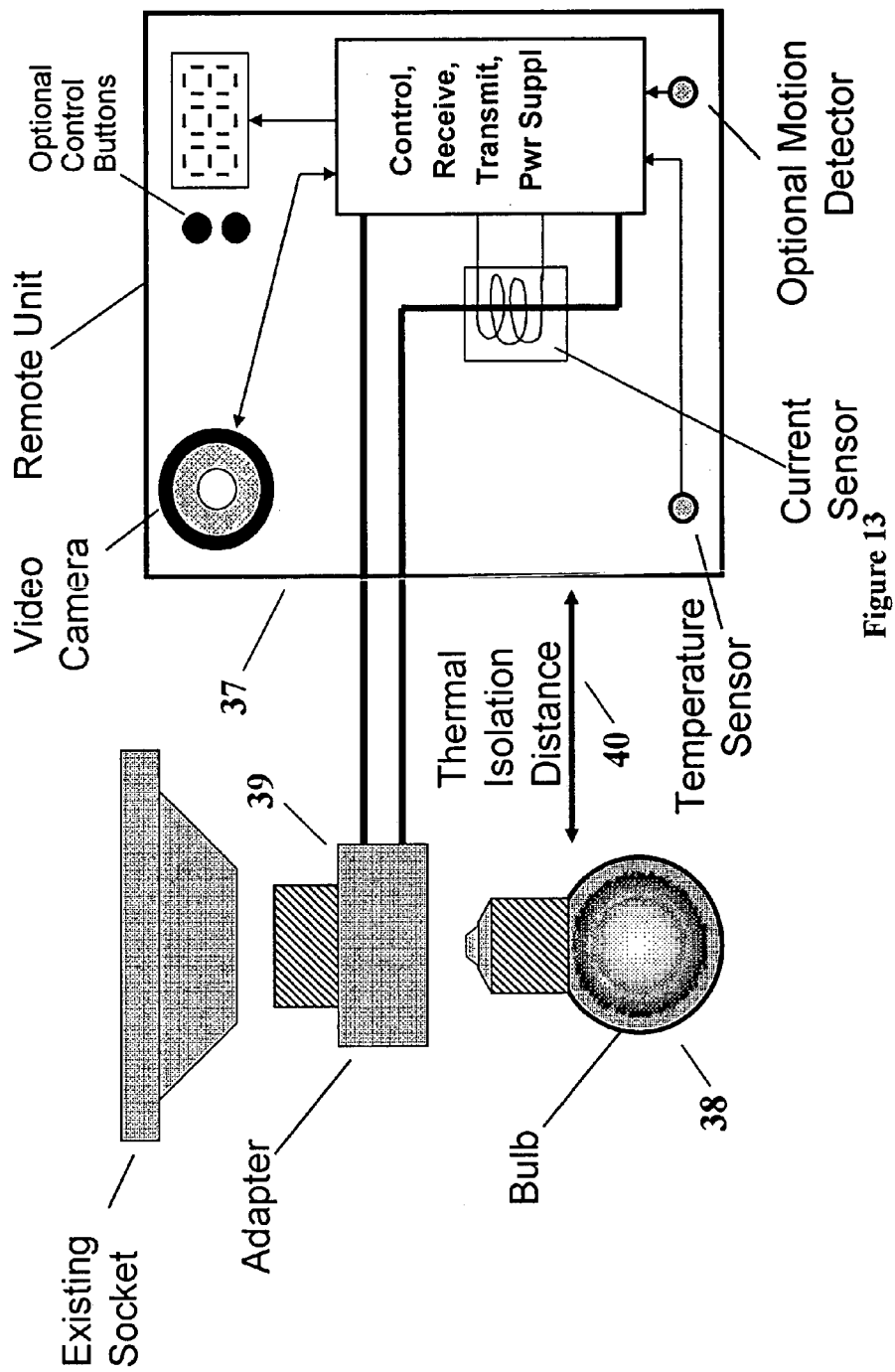
FIG. 13 shows how an EMAC point is used in conjunction with a conventional light bulb socket of the type typically found in attics and garages.

FIG. 13 shows an EMAC point designed to work in conjunction with an "old-fashioned" light bulb socket. These sockets are still prevalent in attics and garages today. In addition to monitoring the power their light bulbs use (they can easily be left on accidentally for long periods of time), since they are located in attics and garages, they can also provide an important thermal feedback function. Attics and garages tend to act as heat reservoirs that can be a source of energy in winter and a drain (due to fan/air conditioning power consumption) in summer. Notice that EMAC point 37 is somewhat remotely located from light bulb 38 to reduce any thermal contamination from the heat produced by the bulb. Intercept adapter 39 is included to divert the power to EMAC unit 37, which is separated from bulb 38 by thermal isolation distance 40. Also, for the unit of FIG. 13 to monitor temperature and transmit that information to the central computer, a power control function may be an absolute necessity if the bulb is to remain off when light is not required (especially important in the attic) depending on whether the bulb socket is remotely switched or not.

Figure 14:
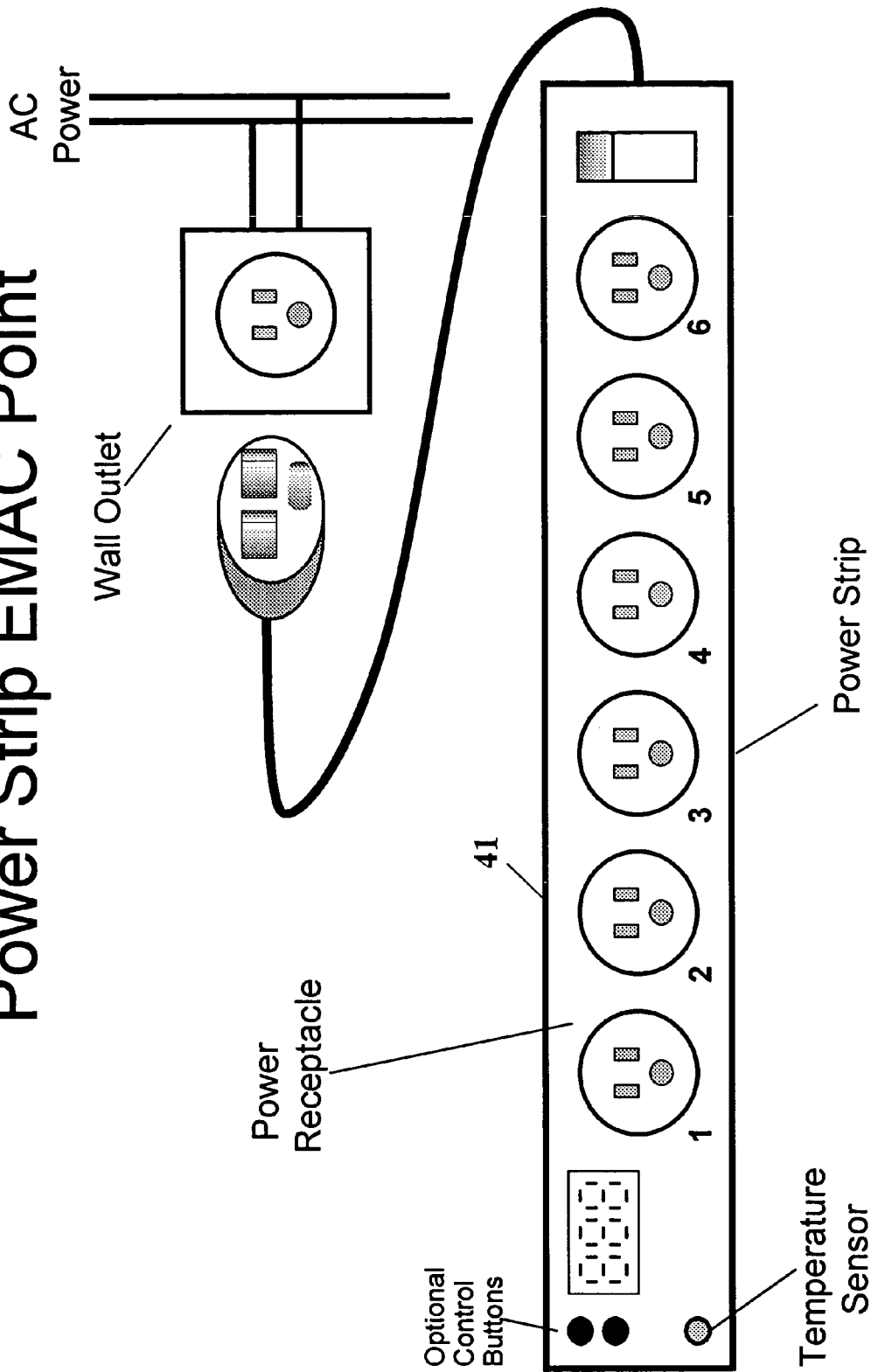
FIG. 14 shows how an assembly including an EMAC point is incorporated into a multi-outlet power strip.

To demonstrate that other forms of power outlets can be adapted to include EMAC points, FIG. 14 shows how a common power strip 41 can include these capabilities. Another form of portable, add-on EMAC point is discussed in FIG. 22 in more detail.

Figure 15:
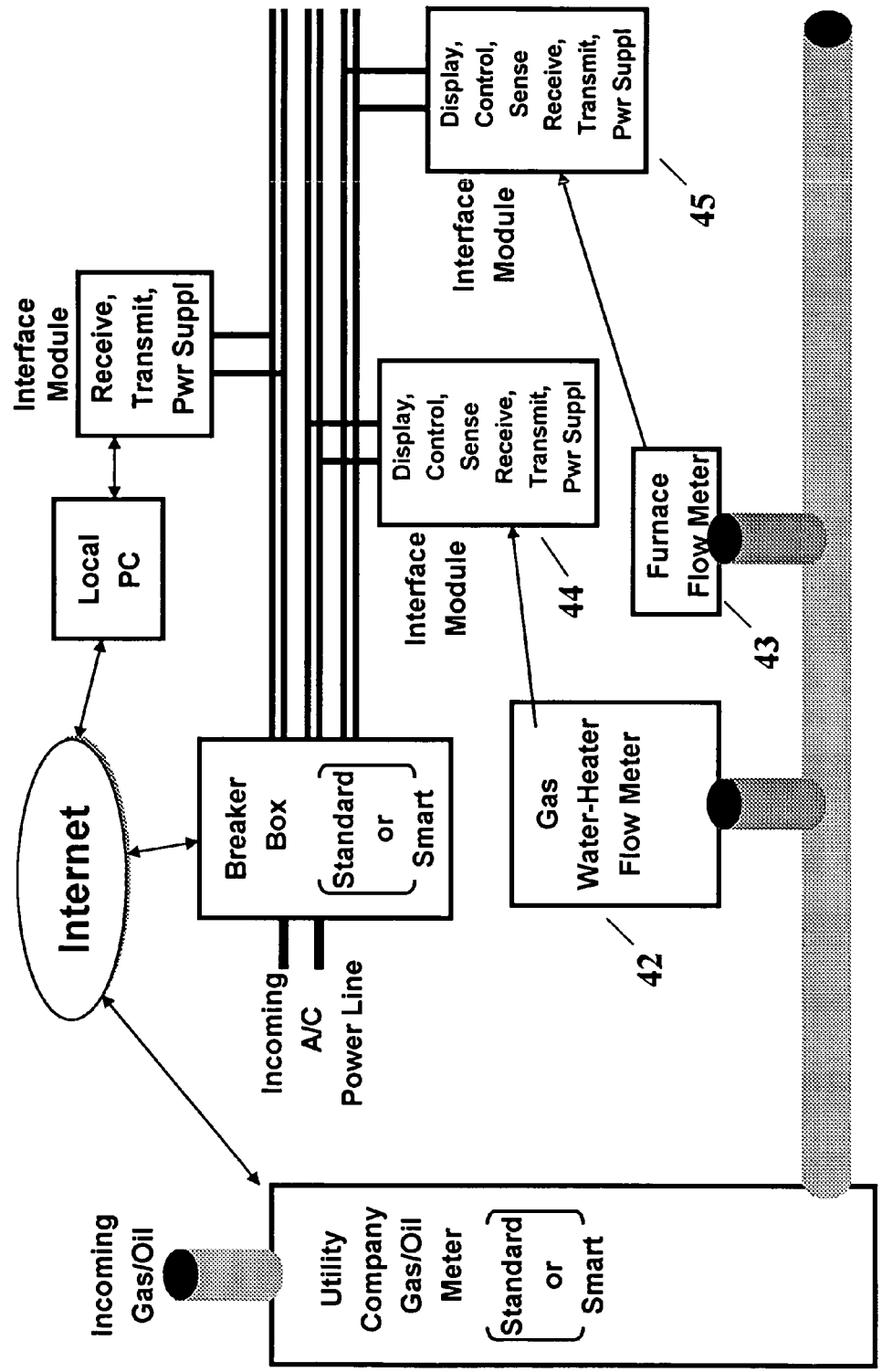
FIG. 15 shows how an assembly including an EMAC point can be connected to flow meters monitoring natural gas or heating oil consumption to allow communication of this information to a local PC.

FIG. 15 shows how the concepts described previously can be extended to other forms of energy monitoring/feedback with an emphasis on oil and natural gas used to produce thermal energy. Flow meters 42 and 43 are inserted into the line carrying the gas/oil to the thermal energy-producing device. The output of each flow meter is then connected to interface modules 44 and 45 respectively that act as EMAC points in a manner somewhat similar to the examples shown in the previous figures. In a similar way, point-of-use feedback is provided and data is transmitted to central PC 9 for use in assembling the overall profile of energy usage for the home/building.

Software operating on central PC 9, among other functions, will be able to create a multi-dimensional map of energy usage as well as prioritized listings of where different amounts of energy are used. Some examples of this capability are described next.

Figure 16:
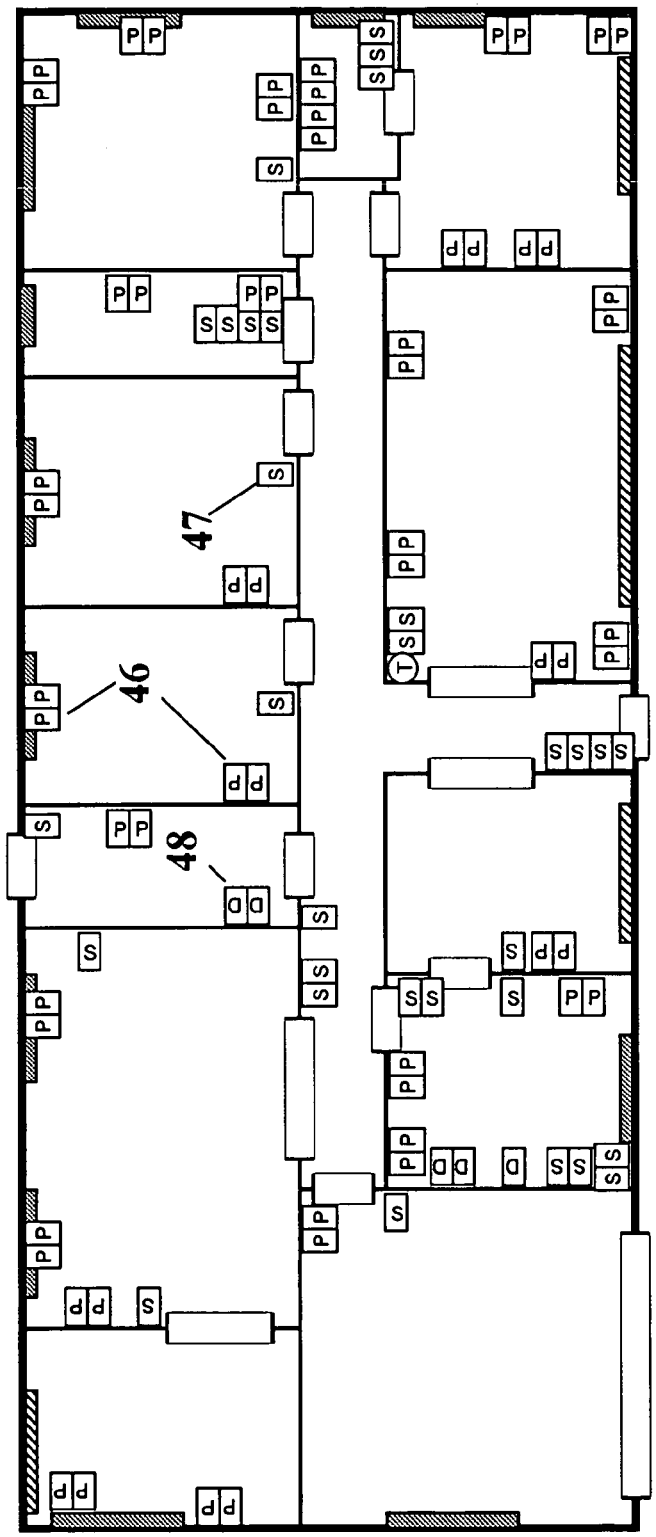
FIG. 16 shows a two dimensional layout drawing for a typical home that has been fully instrumented with EMAC points at wall switch and power plug locations as well as some dedicated locations for directly wired devices.

FIG. 16 shows a two-dimensional plan layout for an example home where locations for all power plugs 46, wall switches 47, and dedicated energy using appliances 48 are identified accordingly. This layout plan forms the basis for energy profiling diagrams that can be presented to the user, thereby allowing easy identification of energy usage anomalies or to better guide the user in implementing more efficient energy usage.

Figure 17:
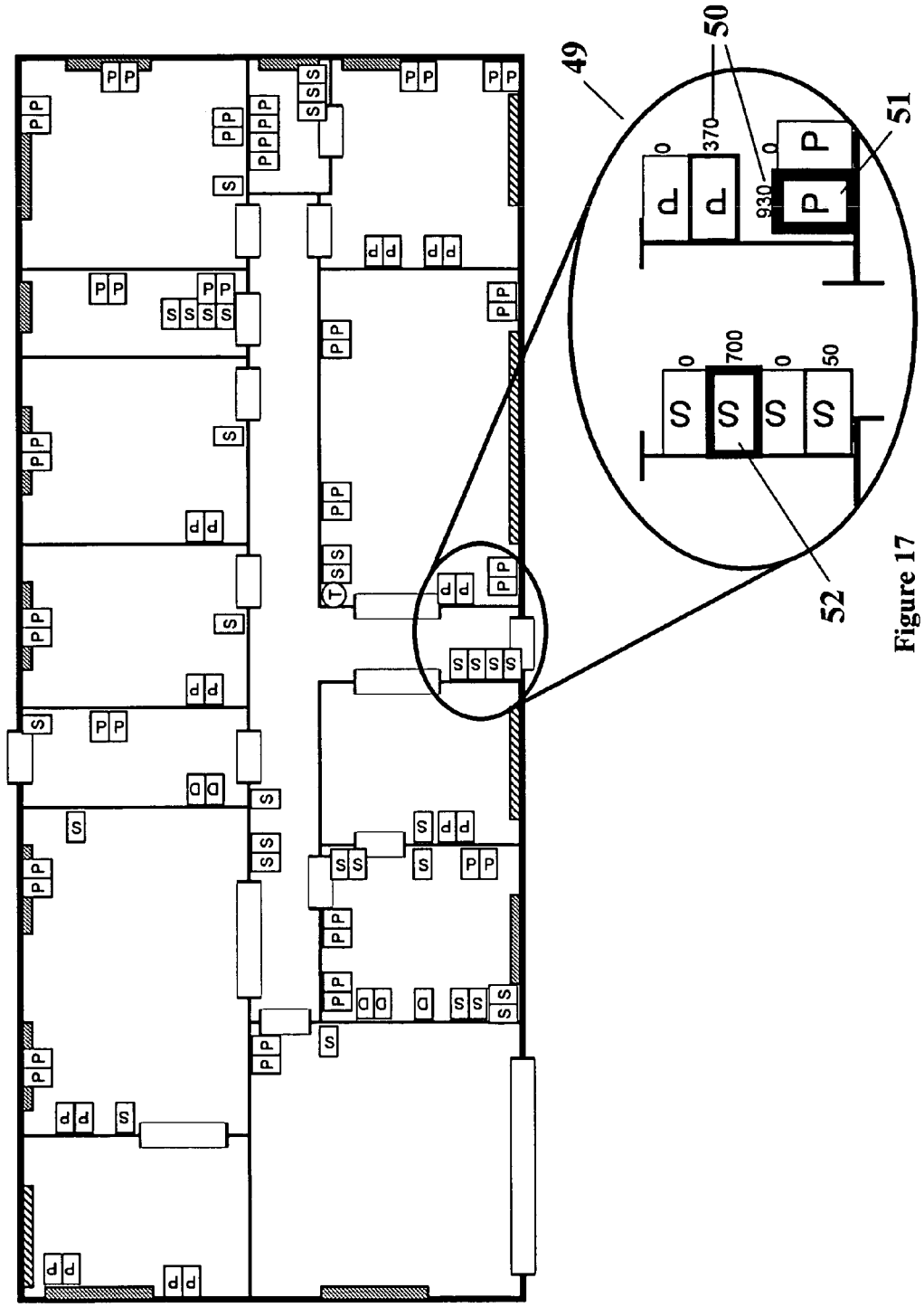
FIG. 17 shows a two dimensional layout drawing for a typical home including a detailed blow-up showing a possible visual representation for an electrical energy utilization profile.

FIG. 17 shows the overall layout for a home where electrical energy usage has been annotated for each of the EMAC points deployed. A blow up view 49 of one section of the home shows how energy usage parameters 50 can be annotated to show the specific energy consumption at any EMAC location. The sample numbers shown for parameters 50 might be in instantaneous Watts, however alternatively, these parameters could be shown as an average consumption over a specific time period. Also, as has been previously shown for the direct feedback energy consumption displays incorporated into EMAC points, the energy consumption parameters in FIG. 17 could display information indicating the cost per time of the energy consumed, again either instantaneously or over some specific time period. The display of FIG. 17 could easily highlight each particular EMAC location designator in a different color according to the level of energy being consumed. Since the diagram of FIG. 17 is shown in black and white, the relative level of energy consumption has been shown visually by the relative thickness of the borders surrounding the plug or switch EMAC point designator. For instance power plug 51 consuming 930 watts, the largest amount consumed of any EMAC point within blowup 49, has the widest border. EMAC point 52 having the next highest level of energy consumption (700 watts) is shown with the second widest border. In an actual software product implementing such a display for the user, the highest energy consuming points might be displayed in the brightest red color, while the lowest energy consuming points might be displayed in darkest blue, with mid ranges of consumption levels being displayed in intermediate shades of color.

Figure 18:
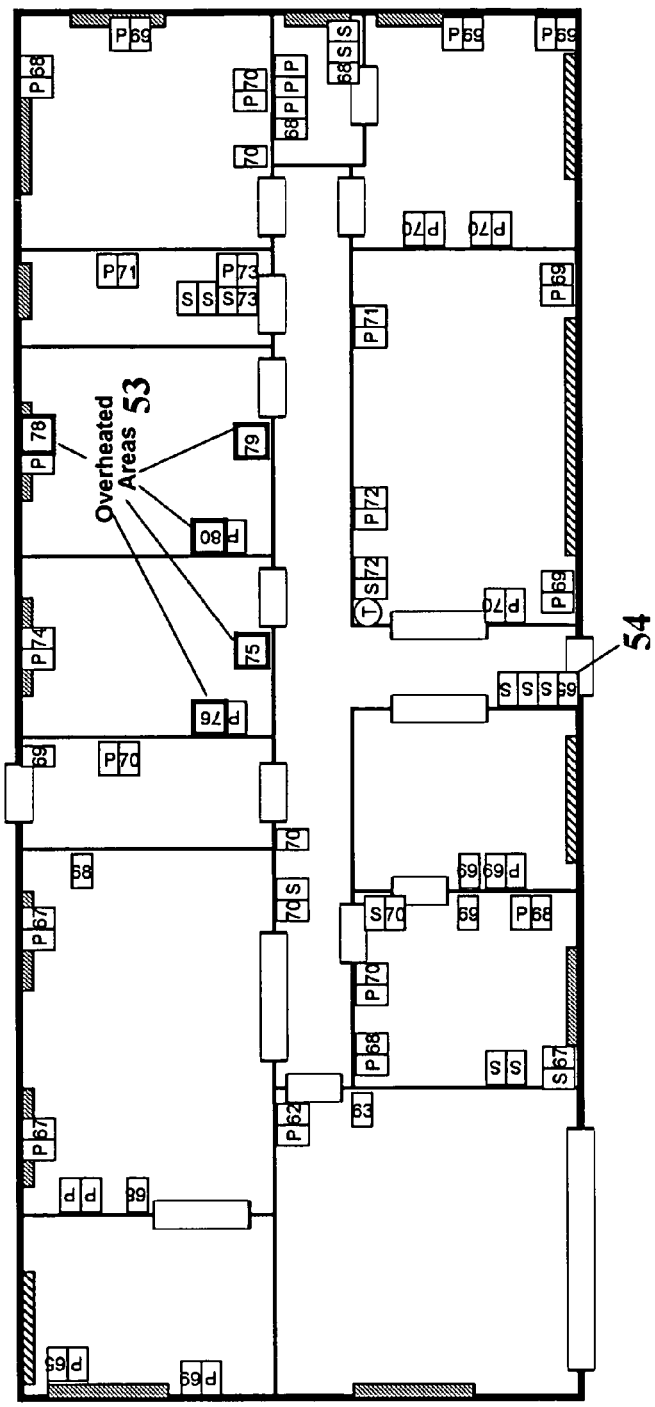
FIG. 18 shows a two dimensional layout drawing for a typical home including a possible visual representation for a temperature profile.

Information from temperature sensors 16 is displayed locally at the particular EMAC point for direct visual feedback, but is also sent to the local PC 9 for processing to allow the creation of a temperature profile for the home/building. FIG. 18 shows a similar layout plan to that of FIG. 17 except that the annotated information reflects the local temperature at each EMAC location. FIG. 18 displays the overall temperature profile in two dimensions (for each level of a multi-level home/building) and can provide feedback (including time-related information) that can help the user reduce (thermal) energy costs by way of a number of useful mechanisms:

1) Areas of the home/building that are being heated or cooled unnecessarily will stand out and the user can take the appropriate corrective action. For instance, overheated areas 53 indicate rooms that are much hotter than necessary, prompting the user to take corrective action such as closing vents that are unnecessarily open. This information can also drive a more elaborate automation scheme where automated control of thermal delivery mechanisms is used. Such delivery mechanisms are exemplified by the electrically controlled wall/floor air flow registers manufactured by EWC Controls of Englishtown, N.J. Other forms of electrically controlled vents, ducts, and registers having controllable, variable air flow are manufactured by a number of other suppliers.

2) Software on the central PC that operates on the thermal profile of the home/building can detect thermal gradients and may be useful in pointing out areas of thermal leakage such as poor weather seals on exterior doors and windows. Notice that EMAC point 54 located near a door of the home displays a temperature of 65 degrees even though the thermostat set at 72 degrees is just around the corner. This would tend to indicate that the seal around the door is most probably inadequate and causing significant energy leakage. The greater the number of temperature sensing points that are placed around the home/building, and especially within a particular room, the more accurate a gradient profile will be able to be produced. To further display temperature gradients in a form familiar to most users, additional software could display extrapolated temperature gradient information in a manner similar to that shown for temperature profiling on weather maps. The more temperature sensors are located in a particular area of the home or building, the more accurate these extrapolated thermal gradient maps would be.

It should be noted that a profiling capability can also be implemented on a Smart Thermostat that is network-connected. Even if such a thermostat does not possess the display size and resolution of a PC or Gateway, useful information can still be provided. For instance, with only one EMAC point in each room or zone in a house, the temperature in each room or zone can be displayed. Also, rooms that are being overheated or overcooled can be enunciated. In one embodiment, a Smart Thermostat could even have a panel display and a miniature keyboard (possibly "QWERETY" style) together enabling a more capable user interface, more familiar identification of rooms and zones, and even a multidimensional thermal profile display.

To make accurate use of the temperature sensor information, it is important that any heat energy generated in the switch or plug receptacles not affect the measurement. For this reason, the temperature sensor will usually be located at the lowest point within a switch or plug EMAC location. It may also be necessary to make the faceplate larger to move the temperature sensor farther from any source of potentially-interfering heat. A switch or plug location is a natural heat generator simply due to the contact resistance where the wiring is attached, the contact resistance of a switch, or the resistance formed at the interface where a plug is pushed into a receptacle socket. Additional heat can also be generated if the EMAC location includes a controlling capability where a semiconductor device is used to clip the A/C waveform—a process having less than 100% efficiency and therefore generating additional heat.

Other variations on a temperature sensor may be possible. In particular, a sensor might be constructed where multiple IR temperature sensing elements are used in conjunction with a prism or alternately where each sensor is directional and is aligned in a different direction, thereby gathering temperature information from different areas of the room such that a spatial image of the thermal gradients in the room can be established.

Figure 19:
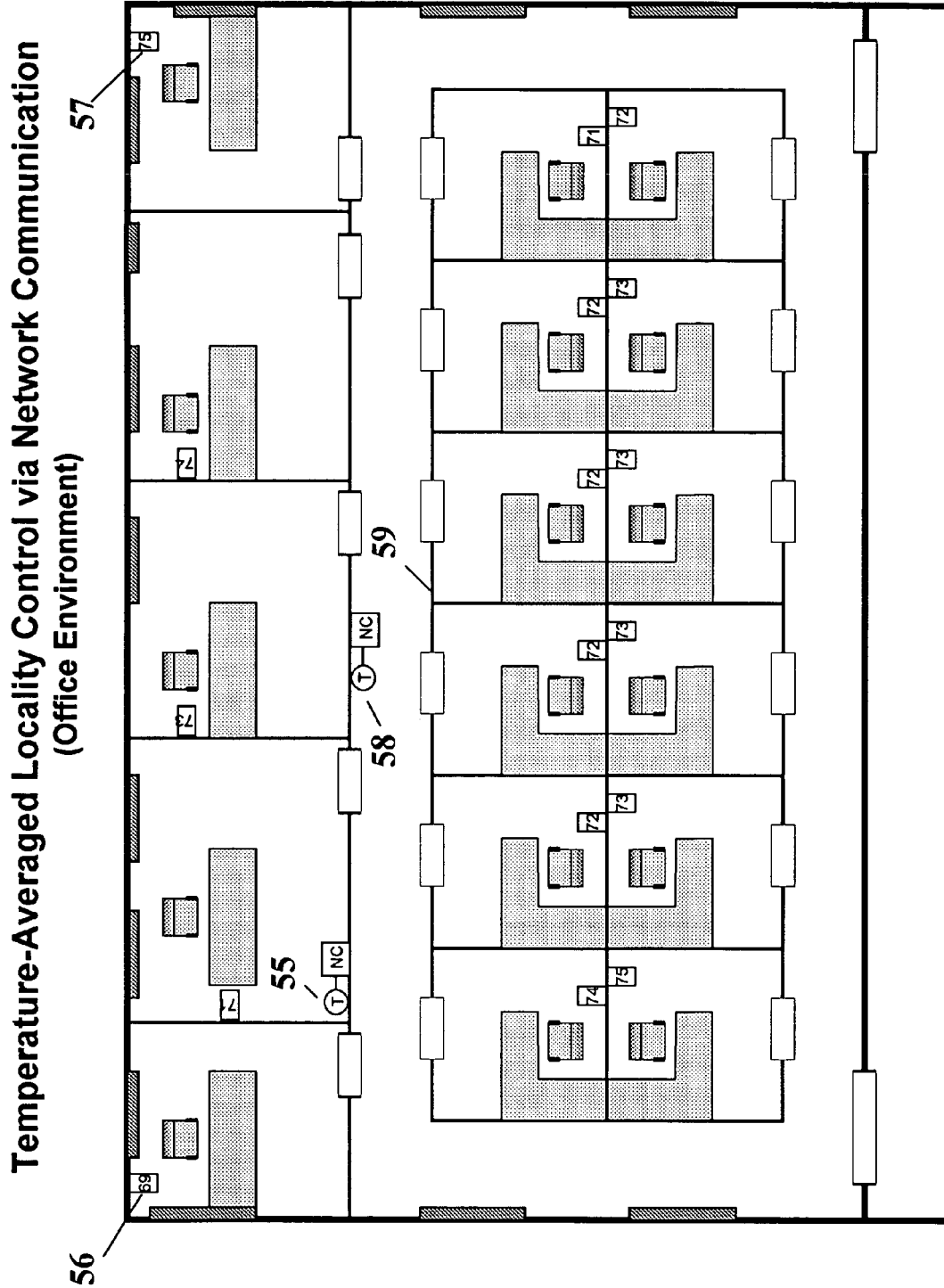
FIG. 19 shows a two dimensional layout drawing for an office environment with distributed temperature sensors communicating through network connections with smart thermostats.

FIG. 19 shows what can be accomplished when the distributed temperature data collection mechanism of EMAC points is utilized to allow a more intelligent control of the temperature in multi-room or multi-cubicle environments while still utilizing a single thermostat (at the existing location) to control existing heating/cooling units. FIG. 19 shows an office environment containing both enclosed offices and an array of cubicles—however the same principles embodied here can be employed in any home or building environment employing EMAC points. Also, the capabilities that will be described relative to FIG. 19 do not require all of the previously described EMAC functionality to be present. In fact, a system consisting of distributed temperature sensors with some form of network interface capability, communicating with a smarter thermostat also having network communication capability, will suffice. Note that a "smarter" network connected thermostat such as 55 and 58 in FIG. 19, should contain a default mode wherein the thermostat reverts to the mode of operation of a traditional thermostat if its ability to collect distributed temperature information is compromised, or if a switch on the thermostat is thrown to force the thermostat into the "traditional" mode of operation.

Also, note that a similar functionality to that described above for FIG. 19 can be achieved by having the network-enabled temperature sensors communicate with any of a number of intelligent controllers, including local PC 9, a Residential Gateway, a dedicated intelligent thermal control system, or even a remote device located elsewhere on the Internet.

The problem being addressed in FIG. 19 is that where the temperature observed at the thermostat location is not at all indicative of the average temperature over the area being served. For instance, thermostat 55 located in one office might control the heating and cooling for the entire row of offices. Due to variations in the ducting and vent structure, as well as the temperature variation across the row of offices during the course of a day as the position of the sun changes, it is not uncommon for some offices to be painfully cold or warm relative to the office possessing the thermostat. For instance, without the control capability embodied in this invention, thermostat 55 may be set to 72 degrees, temperature sensor 56 might register 70 degrees, and temperature sensor 57 might register 80 degrees. With network connected temperature sensors installed in all offices, including the offices containing sensors 56 and 57, the thermostat can compute an average temperature over all of the offices and control the heating/cooling system to reach an overall compromise of temperatures as shown in FIG. 19, thereby eliminating the excessively hot or cool locations that would previously have occurred.

A similar capability can be implemented for an array of open cubicles such as cubicle array 59 where the heating and cooling is controlled by thermostat 58 possessing a network connection. It should be noted that the distributed temperature collection capability required to implement the functionality of FIG. 19 does not require network connectivity over power lines as described in most embodiments of this invention. A smart temperature sensor connected to an Ethernet port would suffice to implement this capability, and in most office and cubicle environments today, Ethernet connections are plentiful. Also, the existing thermostat location and connections can be utilized with the addition of a network connection.

A variation on the capability shown in FIG. 19, and applicable to any environment having the ability to collect temperature information in a distributed manner, relates to a home where multiple EMAC points have been installed around a room or around multiple rooms. Here, a smart thermostat communicating with these EMAC points can be programmed to achieve a desired temperature at a specific location within each room during specific time periods (essentially ignoring the temperature at the thermostat itself). For instance, the system could seek to achieve a temperature of 70° in the Kitchen from 5:00 to 7:00 PM and then seek a temperature of 70° at the Living Room couch location from 7:00 PM to 10:00 PM.

Of course, a more desirable overall thermal result could be achieved for scenarios similar to those described for FIG. 19 if the controlling device (smart thermostat, PC, or other form of intelligent processor) is also able to control the amount of airflow allowed through a multitude of distributed, electrically controlled, variable airflow vents, ducts, or registers.

Figure 20:
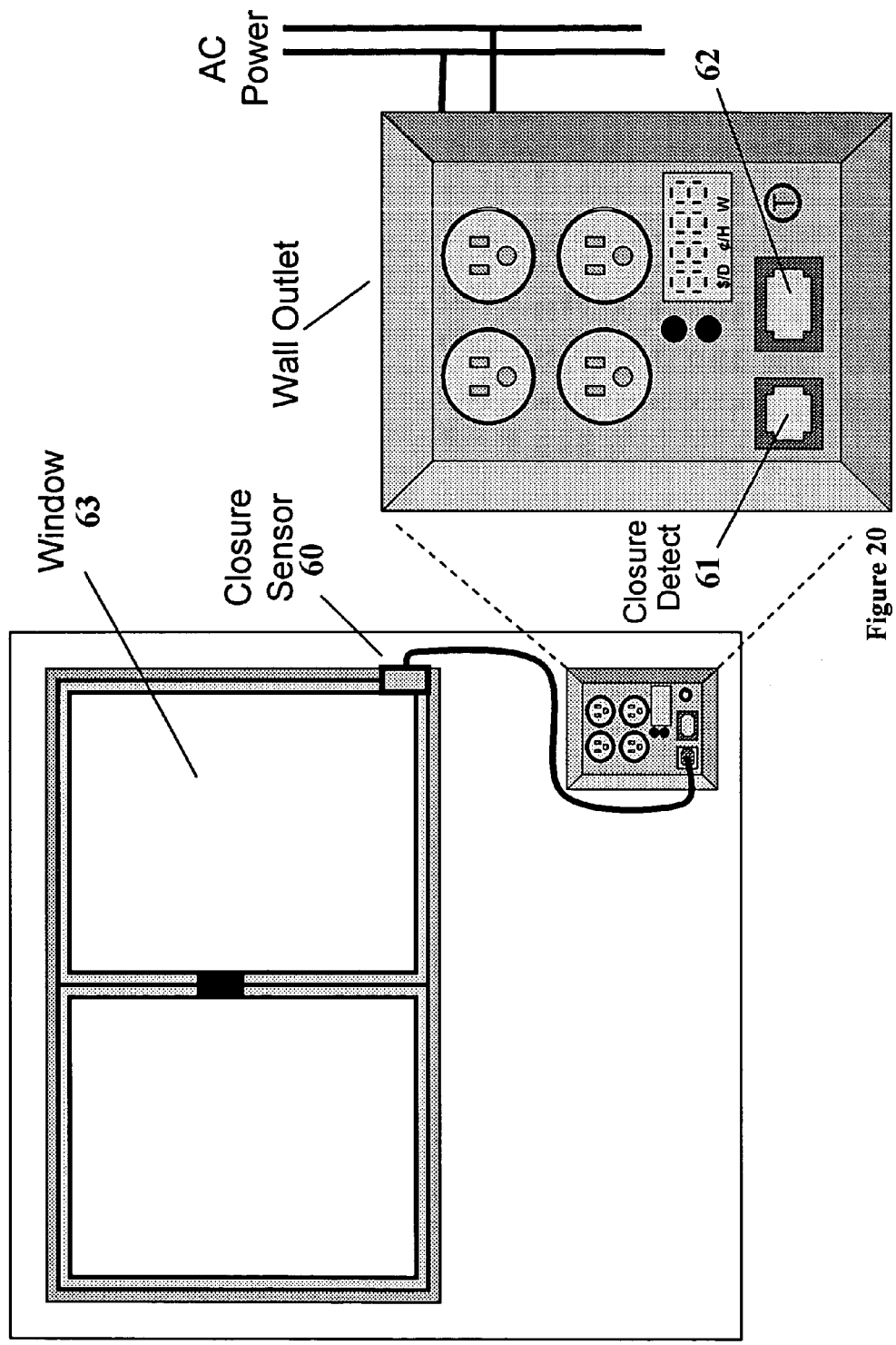
FIG. 20 shows an EMAC-enabled wall-outlet having a closure detection provision allowing the unit to determine when a nearby window is open.

FIG. 20 shows how an EMAC point can offer a closure detection capability that, when connected to a closure-sensing switch 60 on a window 63, can determine whether the window is open or closed. While this feature certainly has application in performing a security function, a very common loss of energy in many homes occurs when windows are inadvertently left open. Therefore such a closure detection capability is valuable within an energy management scheme as well. While FIG. 20 shows an additional jack 61 on the EMAC wall outlet, the wire from the closure sensor could connect directly with network jack 62 assuming the closure sensor had an Ethernet connection capability.

Figure 21:
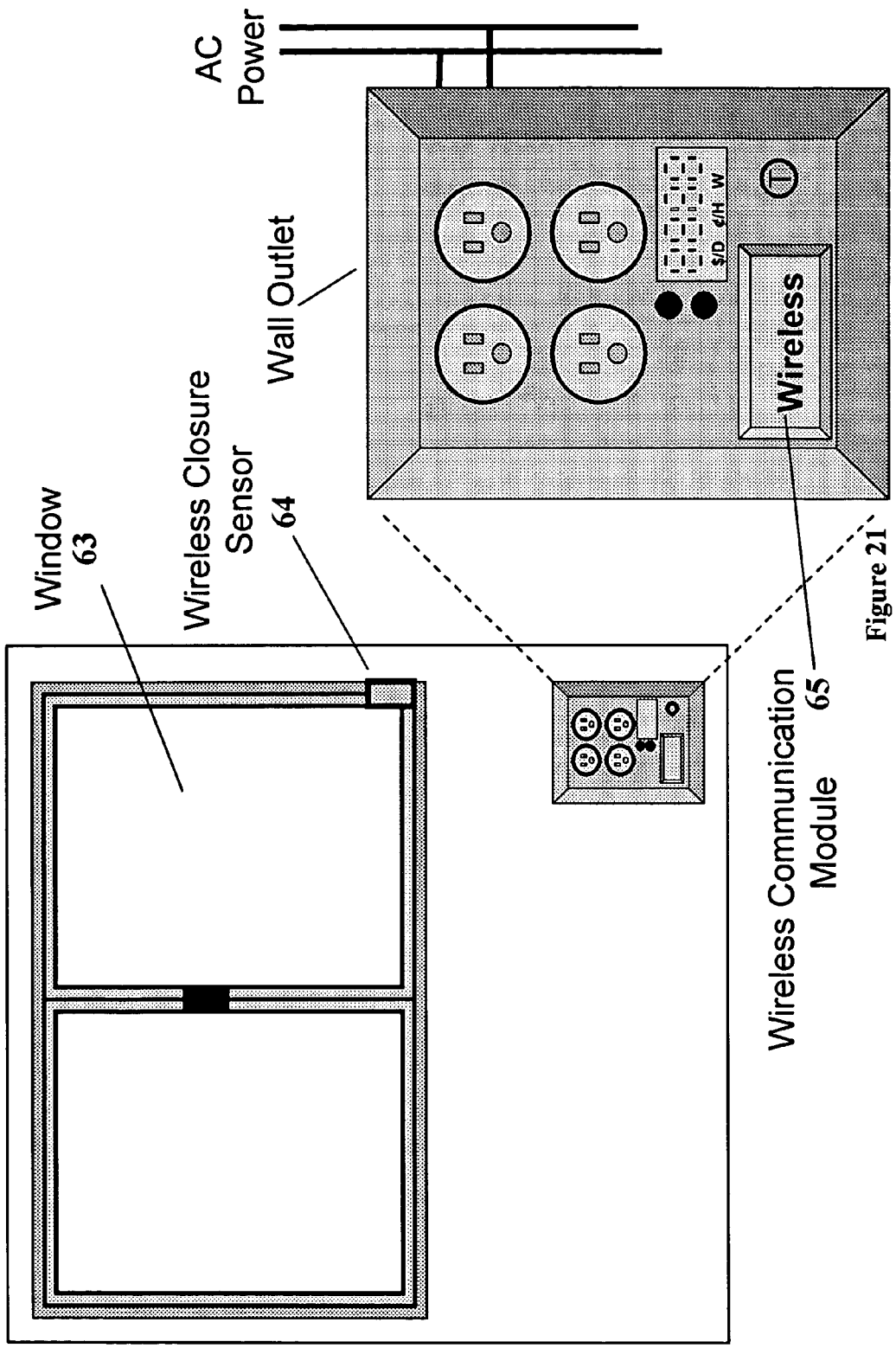
FIG. 21 shows an EMAC-enabled wall-outlet having a closure detection provision allowing the unit to determine when a nearby window is open, including wireless communication between the EMAC point and the closure detection sensor.

FIG. 21 shows a window closure detection capability similar to FIG. 20, except that a wireless closure sensor 64 communicates with wireless communication module 65 located on the EMAC point. This wireless communication module 65 could be a very simple low bandwidth low-cost unit, given the simplicity of its task, and its close proximity to the windows within the room it services. Even a simple wireless communication module 65 could be designed to communicate with multiple wireless closure sensors 64 within a single room.

Alternately, wireless communication module 65 might have a higher bandwidth capability, allowing more sophisticated local communications within a room or zone. A more sophisticated wireless communication module might be implemented with a technology such as "Bluetooth", previously referred to as an alternative local connection capability in the description relating to FIG. 6. Such a more sophisticated wireless module could still communicate with window closure detection modules 65, but could also communicate with any wireless network-enabled device or appliance within the room being served that was capable of communicating via the "Bluetooth Standard". This wireless configuration can even support communication with a wireless-enabled laptop/notebook computer that can move about within a room or zone.

Other standards than Bluetooth can be supported in this way, including the IEEE 802.11 standard commonly used today for local wireless communications. As mentioned earlier, communicating between EMAC points through power lines circumvents difficulties encountered with wireless communication in many home environments (including 802.11), where wireless signals often have great difficulty traveling through multiple walls.

In the configuration described in the previous paragraph, there would be multiple local wireless communication modules 65, sometimes one to a room or one to a zone if the range of a single module can successfully penetrate a wall or two. Each of these local modules is now essentially a host in its own right. The home or building environment now resembles a cellular phone system with multiple hosts and zones, and requires a management scheme that may be similar. A moveable wireless device might switch from communicating with one particular module 65 to a different module 65 as its location changes. Alternately, a wireless client device having a fixed location, like window closure detector 64, can be programmed to communicate exclusively with a specific wireless communication module 65.

Figure 22:
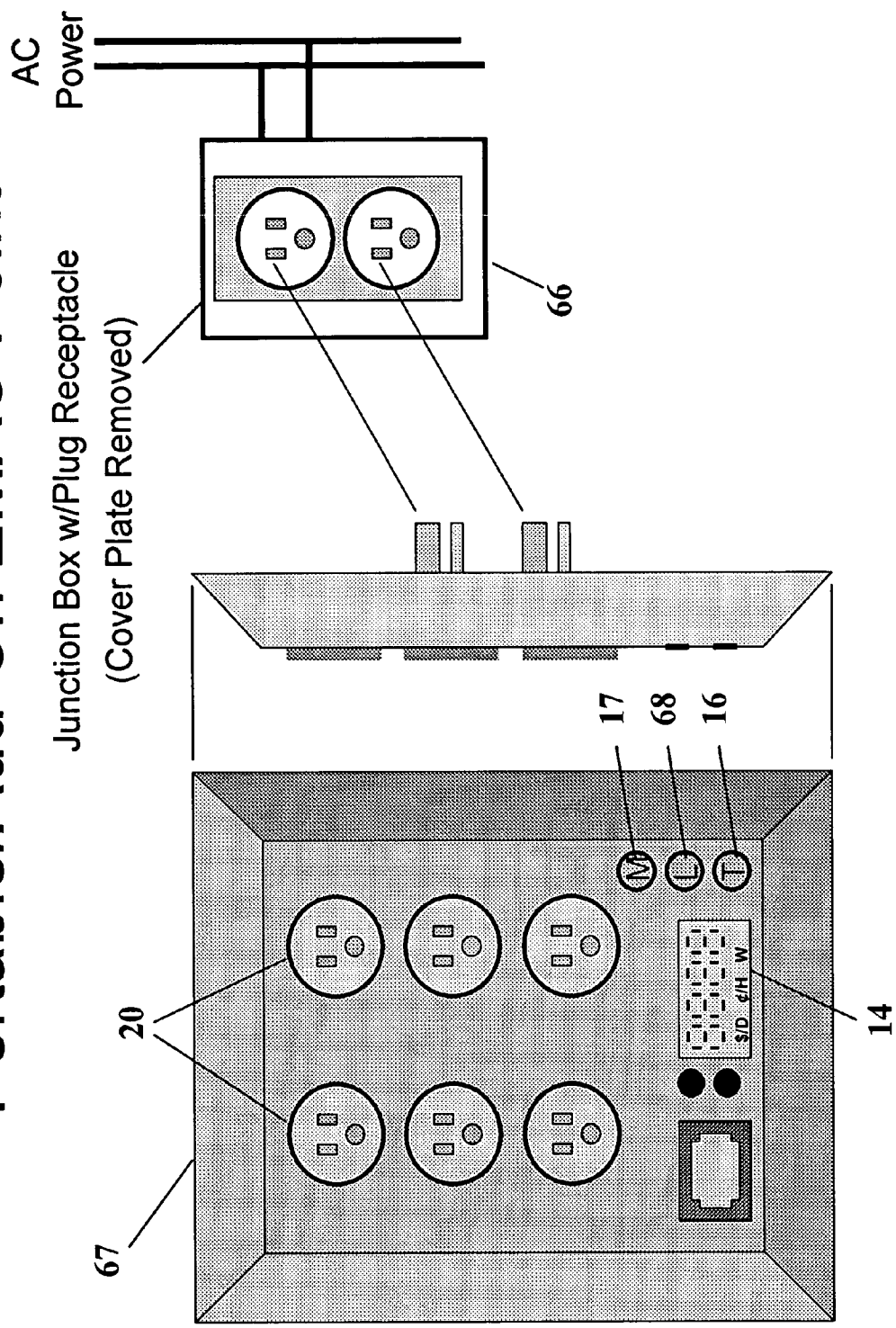
FIG. 22 shows a portable or add-on EMAC wall outlet assembly that can easily be plugged into an existing conventional wall outlet and can also be easily moved to other locations within a home or building.

FIG. 22 shows a form of portable/add-on EMAC point 67 that can easily plug into an existing wall outlet plug receptacle installed in electrical junction box 66. While this capability is very similar to the power strip EMAC point shown in FIG. 14, it is different in that it would replace the cover plate on the plug receptacle at junction box 66 and after being plugged in, would effectively become a new cover plate, but with considerably enhanced capabilities. FIG. 22 also shows, in addition to previously described temperature sensor 16 and motion detector 17, a light intensity detector 68 that may be useful if, for instance, this portable EMAC point is the only EMAC point installed in a particular room. One of the benefits of having a portable, easily added unit like that in FIG. 22, is that it allows the user to purchase a limited number of EMAC points in order to start using their capabilities, without making a more permanent installation by replacing actual plug receptacles or wall switches. Therefore, it may be useful to have a light detection capability such that a profile of lighting usage can be established by software running on central PC 9. Also notice that portable EMAC point 67 may contain any number of plug receptacle locations 20 (six are shown here). Having multiple outlets not only offers the user the convenience of not having to use a multiple outlet extension cord or power strip when more than two power consuming devices/appliances must be plugged in, it also provides independent energy monitoring for each of these receptacle locations thereby providing more precise information on energy utilization. In addition, display 14 in FIG. 22 can display the total power consumption at the receptacle location and even provide a warning if the maximum allowable power level for a receptacle assembly is being exceeded. Alternately, an audio emitting transducer within unit 67 could provide a similar warning.

When a system according to this invention is installed in a home or building whereby a multitude of EMAC points are distributed throughout multiple rooms, it then becomes necessary to identify the location of each EMAC point in order for software running on local PC 9 to perform profiling of data relating to energy consumption. The larger the quantity of EMAC points, the more complex and time-consuming this task becomes. It therefore becomes useful to have a mechanism to automate this process of identifying specific EMAC point locations. Another related task is that of drawing an electronic representation of the two-dimensional plan layout for the home or building that is required for proper display of the profiling information. For most existing homes, and even some new homes, this electronic representation will either be nonexistent or inconvenient to gain access to. A method for automatically creating an electronic plan layout and, at the same time, identifying all EMAC points, would be both efficient and useful.

Figure 23:
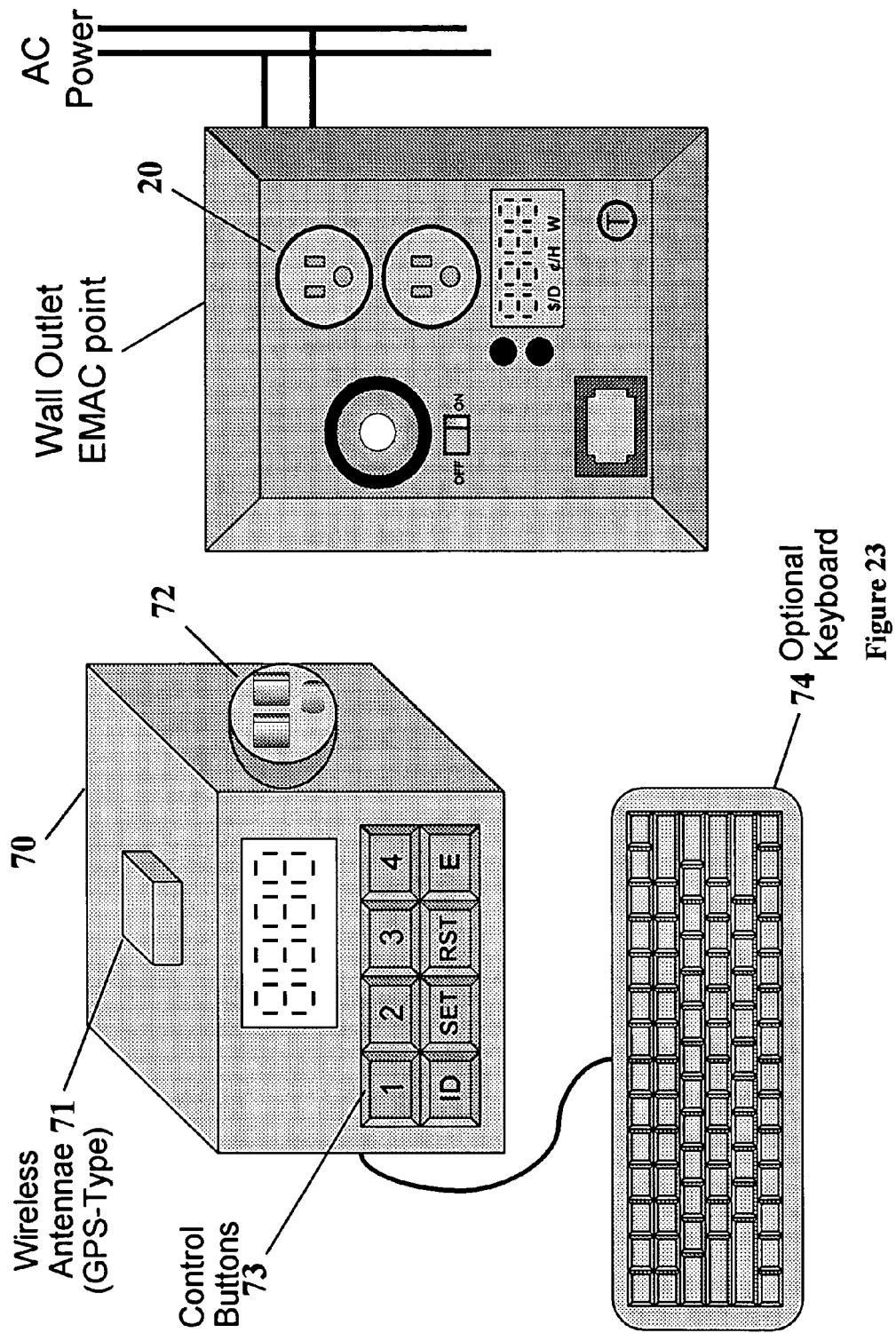
FIG. 23 shows a portable EMAC identification unit that is used in proximity to, or attached to, an EMAC point. When operating in conjunction with appropriate position locating apparatus, this device will assist the user in creating a two dimensional layout map of a home or building while automatically identifying the location of EMAC points.

Portable EMAC identification unit 70, shown in FIG. 23, can be used to perform this capability. This particular unit relies on a wireless antenna 71 constructed in such a manner that when receiving signals from multiple transmission beacons, the position of unit 70 can be accurately determined through triangulation. Principles such as those used in the GPS (Global Positioning System) may be utilized where the beacons and receiver all contain synchronized clocks and signal travel times from different beacons (similar in concept to GPS satellites) are compared—the position being determined by triangulation. Different frequencies and signal strengths would have to be used to enable the penetration of walls of the home or building.

Alternately, a similar system can be constructed where unit 70 contains a transponder. The transponder echoes each signal received back to the source beacon where the distance is determined by phase shift information that is then communicated back to unit 70. EMAC identification unit 70 can identify EMAC locations by plugging into a power plug 72, or simply by placing it adjacent to a power consuming switch, or a device with dedicated wiring, and indicating through integral keypad 73 or optional keyboard 74, the device being located. As will be explained later in FIG. 27, each EMAC point may have an integral serial number that can be used as part of the identification process.

Figure 24:
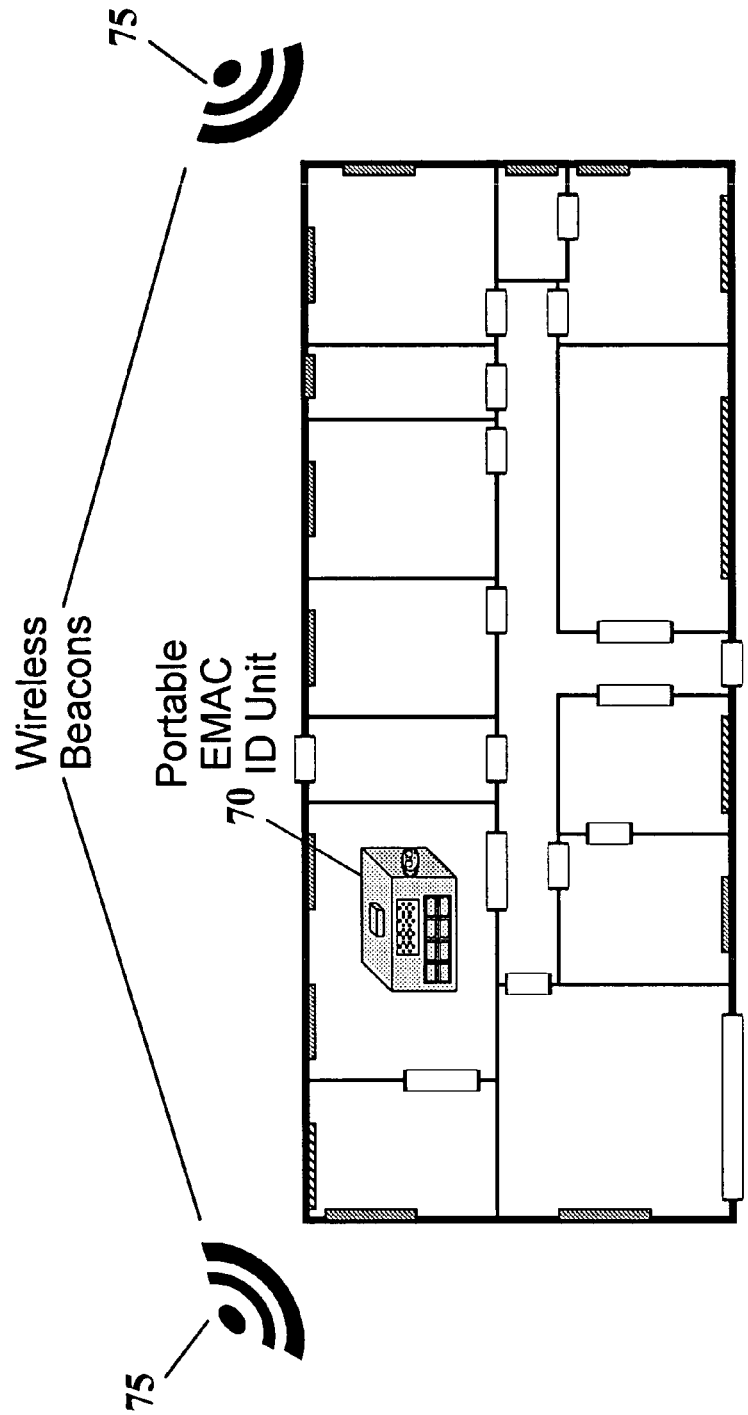
FIG. 24 shows how a portable EMAC identification unit might be used with multiple wireless transmitting beacons to determine its position in a manner similar to that used in the GPS (Global Positioning System) system.

FIG. 24 shows an overall view of a home or building where identification unit 70 receives signals from a plurality of wireless transmission beacons 75. The exact placement of these beacons may not be critical since, once a reference point has been established for identification unit 70, only relative position information is necessary to establish the locations of EMAC points, as well as the dimensions and layout plan of the home or building. If it is desirable to determine EMAC locations in three dimensions, a third beacon located at a different elevation setting from the initial two beacons 75 may be added. Accordingly, the antennae on identification unit 70 would have to be enhanced to allow position detection in three dimensions. More than three beacons may be useful in some circumstances where signals have difficulty penetrating the building structure in some places.

In fact, given proper frequencies along with the appropriate circuitry and antenna system within the identification unit, it would be possible to establish positions with a resolution of distances to a fraction of an inch. In this case, the system described in FIG. 24 is also capable of becoming a measurement system. Such a measurement system could be developed and used independent of any specific use relative to energy or thermal information, being used solely as a semi-automatic way to obtain precise dimensions of an existing home or building in order to create an accurate drawing. The need to create an accurately dimensioned drawing of an existing home or building occurs quite frequently when modifications to an existing structure are being planned.

Figure 25:
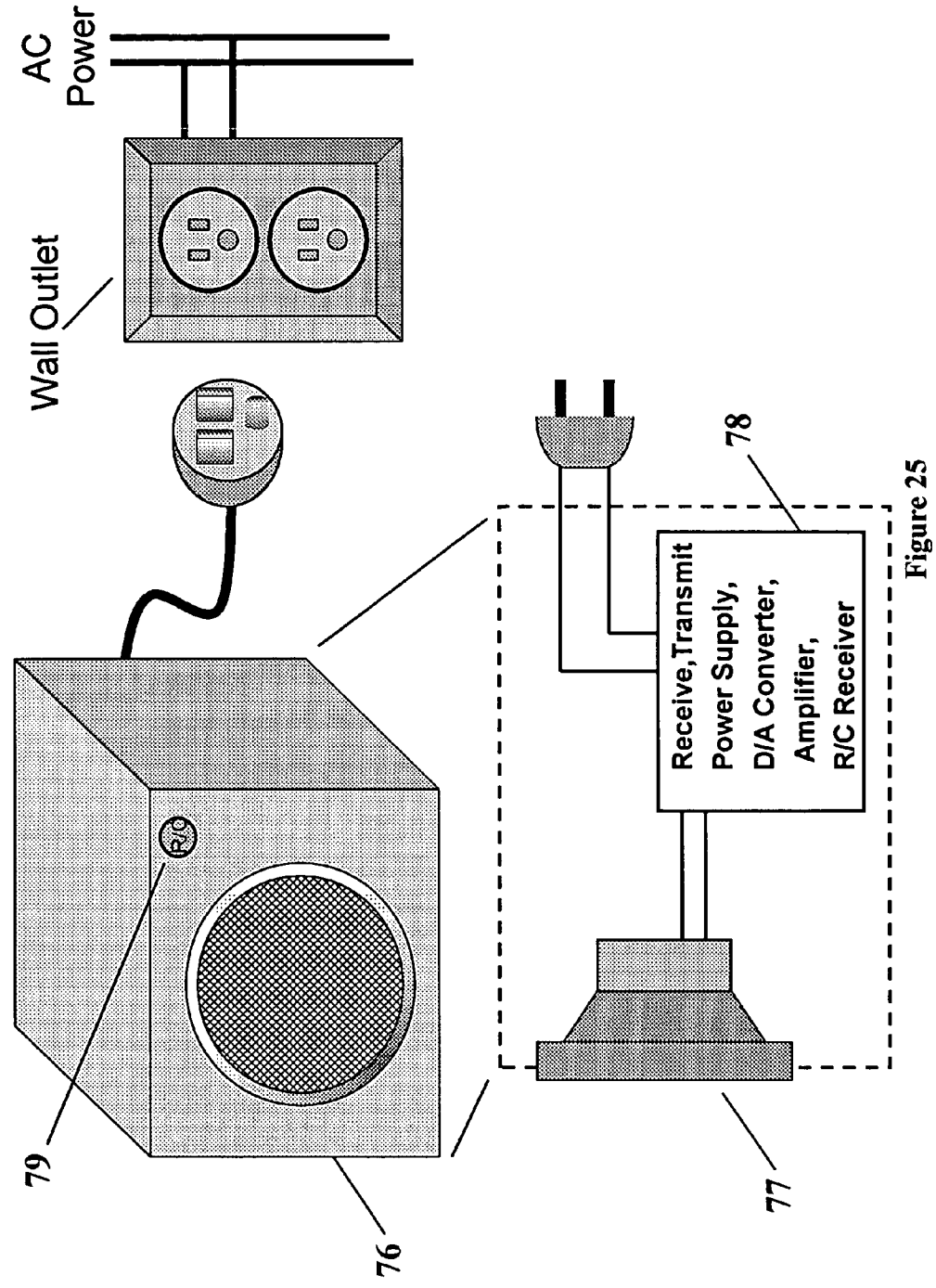
FIG. 25 shows how audio information can be transmitted to an EMAC point over the data connection and then be converted to audible sound by circuitry which is powered by the same power line that carried the data.

FIG. 25 shows how audio information, in particular music, can be transmitted via a digital communications circuit through power lines, thereby enabling an audio output node unit 76 containing a Speaker 77 as well as interface circuit 78. Interface circuit 78 would have the ability to receive and transmit information as well as convert a digital audio stream to an amplified signal capable of driving Speaker 77. Interface circuit 78 may also contain some form of remote control receiver 79 which could be either infrared or wireless. With this remote control capability included, interface circuit 78 may also contain a transmit capability such that any control requests can be forwarded to similar audio output nodes and/or to the source of the audio information via the powerline network.

Figure 26:
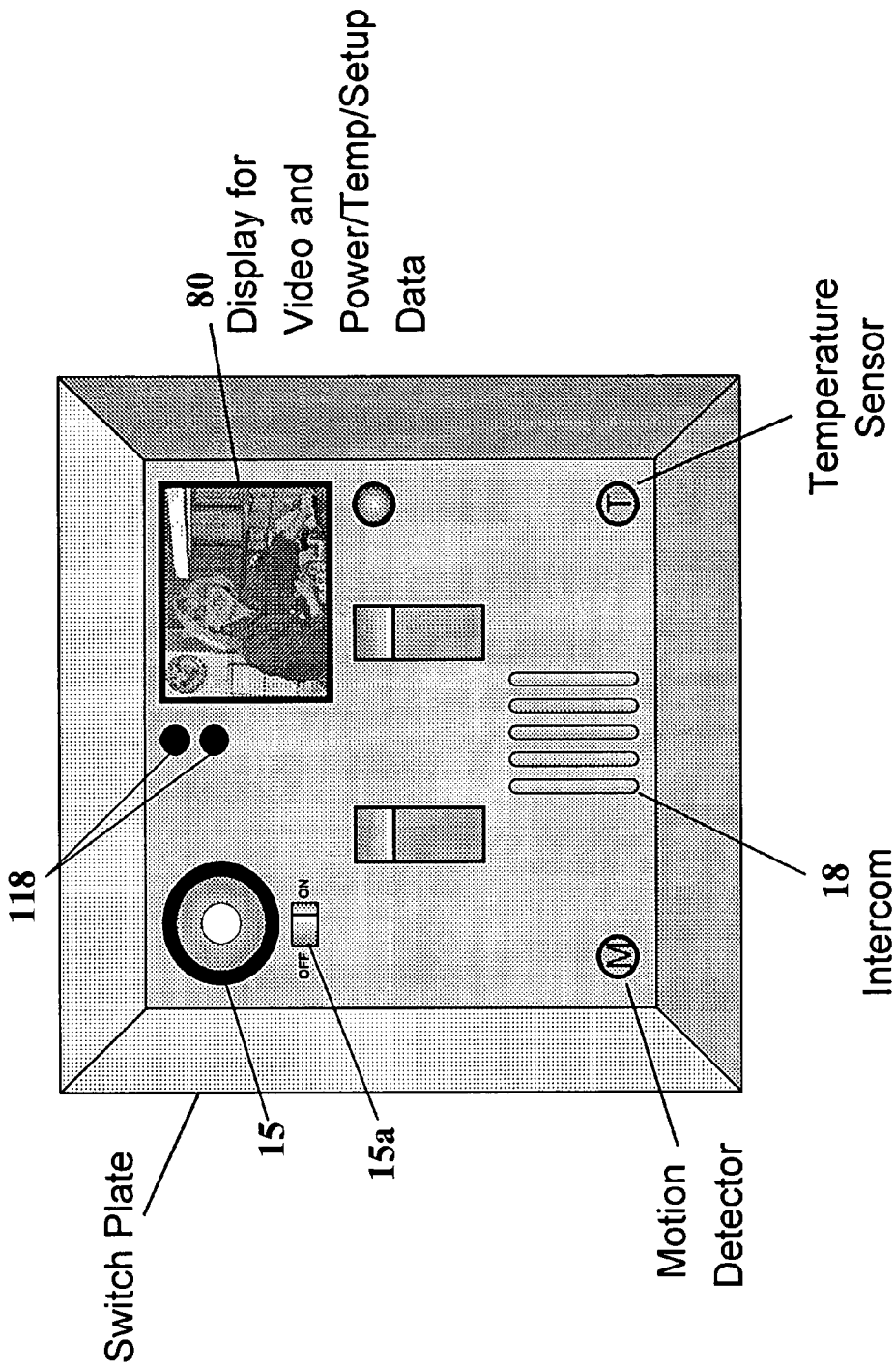
FIG. 26 shows how a full motion video panel display can be incorporated into an EMAC point allowing a multi-media intercom/teleconferencing capability as well as viewing of other areas of the home for surveillance purposes, in addition to displaying energy consumption and temperature data.

FIG. 26 shows how the integral display contained in many of the EMAC points of this invention could be constructed as a general purpose video panel display 80. Of course, video display 80 could provide all of the energy-related information described for variations of integral display 14 shown in earlier figures. In addition, given a connection with sufficient bandwidth (either digital or via analog video signal), display 80 can show a picture captured by any video camera 15 within the home or building, or alternately can display video information being transferred to the home or building via the Internet. Essentially, this creates a "video intercom" capability. When combined with audio intercom 18, a multimedia intercom capability is created, which can be controlled either by control buttons 118 located on the assembly, or by voice recognition commands, or both. For instance, by observing a video display in the master bedroom, a user could check for activity in different rooms throughout the house. This capability is further enhanced if the user can initiate a command that controls lighting throughout the house, thereby illuminating the rooms to be observed. Similarly, lights illuminating the outside perimeter of the house can be controlled, and video cameras mounted so as to observe these areas and supply information that can be viewed on display 80. The form of control buttons 118 in FIG. 26 can be expanded to include a lighted keypad to allow command input regarding what room is to be observed and/or illuminated. Such a keypad could have specific buttons/keys that are marked with the names of the particular rooms that might be observed.

Another use of display 80 is to enable interactive video conferencing, not just within the home, but with someone located at a remote location via the Internet. Although such video conferencing is of course possible on any PC given an attached camera, the unit shown in FIG. 26 allows a more spontaneous form of conferencing. For instance, a parent, while at work, might observe the activity of a child at home and spontaneously initiate a conference via the assembly shown in FIG. 26 which is directly accessible to the child in whatever room they happen to be.

As mentioned earlier, in order to properly identify EMAC points within a home or building, some form of integral serialization for each EMAC unit may be desired. This can be accomplished in a number of manners, the simplest being to add a form of programmable memory within one of the integrated circuits contained within the EMAC unit. During the manufacturing process, each EMAC unit would then be briefly connected to a programming system that would install a unique serial number in each EMAC unit. However, it may be overly expensive to include a memory chip, or build any of the required semiconductor devices on a process capable of supporting electrically programmable memory. If the cost of this method is prohibitive, an alternative approach would be to include some form of electrically scan-able matrix on a PCB (Printed Circuit Board) within the unit, such as matrix 81 shown in FIG. 27. This matrix is scanned by applying patterns to the wires oriented along a first axis while observing the values that appear on the wires oriented along the axis orthogonal to the first axis, thereby scanning the matrix and determining which intersections are connected and which are not. If the matrix is comprised of wiring traces on the PCB, it would be normal to initially have the matrix fully connected at each intersection, and then selectively delete connections at certain intersections in order to affect the programming pattern for the serial number.

This deletion could be performed by a number of methods including laser cutting, or use of a burnable fuse structure at each matrix intersection, all of which are techniques known in the art. An alternative to deleting conductive material at a matrix intersection would be to have the ability to selectively add conductive material at selected intersections and to have all matrix intersections start out in an electrically unconnected state.

EMAC points are also quite useful at the exterior of a home or building as shown for a light mounted on exterior wall 84 of a home or building in FIG. 28. Here, junction box extension unit 82 is added between exterior electrical junction box 83 and exterior light 87. Extension unit 82 has both motion detector 85 and video camera 86 attached and also includes a circuit for controlling exterior light 87. Also included in extension unit 82 is a communication circuit capable of sending digital information to and from any remote device by way of the electrical power line available at the junction box. Video information is digitized, compressed, and sent over the powerline communication link. Also, motion detection information, temperature information, and power consumption information for light 87 can also be transmitted in a similar manner. Exterior light 87 can also be controlled remotely via the communications link.

Note that, in this specification, where a single video camera is shown as part of an assembly, multiple video cameras can also be included within the same assembly thereby covering a larger overall viewing area. Also, multiple cameras within the same assembly may also share some of the video compression circuitry and other support circuitry that may also exist in the assembly.

Therefore, a system for incorporation in homes or buildings has been described that allows energy related information to be gathered by way of EMAC points typically installed at convenient locations such as electrical junction boxes used for plug receptacles and wall switches. In addition to being visually displayed at the point of energy use or measurement, this energy related information is typically communicated through a power line data link to a centrally located, local PC or directly to a device on the Internet where this information can be used for energy profiling and or control. Also, taking advantage of the data transmission capability required for communication of energy related information, as well as taking advantage of the power available at junction boxes, network access points are easily made available. Given the vantage point afforded by a typical wall switch located at the entry to a room, video cameras and/or video displays may also be included in the assembly implementing a wall switch EMAC point.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A portable energy monitoring point designed to plug into a standard power plug receptacle at an electrical junction box, including within said portable energy monitoring point:
    a plurality of power plug receptacles;
    integral current sensors capable of determining measured levels of electrical current consumed by electrical loads connected to any of said plurality of power plug receptacles;
    an integral circuit for providing said measured levels of electrical current in digital form;
    an integral digital communications circuit capable of sending and receiving digital information, including said measured levels of electrical current consumed, to and from a remote device; and
    an integral digitally controlled display.

2. The portable energy monitoring point of claim 1, where said digital communications circuit capable of sending and receiving digital information to and from a remote device does so by way of a power line connection available at the junction box.

3. The portable energy monitoring point of claim 2, further including:
    an integral sensor for measuring an ambient temperature; and
    an integral circuit for providing said measured ambient temperature in digital form and making said digital ambient temperature available to said digital communications circuit and/or an integral display.

4. The portable energy monitoring point of claim 1, further including:
    an integral sensor for measuring an ambient temperature; and
    an integral circuit for providing said measured ambient temperature in digital form and making said digital ambient temperature available to said digital communications circuit and/or an integral display.

* * * * *